United States Patent
Negi

(10) Patent No.: US 10,479,323 B2
(45) Date of Patent: Nov. 19, 2019

(54) VEHICLE WIPER DEVICE AND VEHICLE WIPER DEVICE CONTROL METHOD

(71) Applicant: DENSO CORPORATION, Kariya-shi, Aichi (JP)

(72) Inventor: Takafumi Negi, Kosai (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 15 days.

(21) Appl. No.: 16/069,169

(22) PCT Filed: Jan. 12, 2017

(86) PCT No.: PCT/JP2017/000877
§ 371 (c)(1),
(2) Date: Jul. 11, 2018

(87) PCT Pub. No.: WO2017/126415
PCT Pub. Date: Jul. 27, 2017

(65) Prior Publication Data
US 2019/0009748 A1  Jan. 10, 2019

(30) Foreign Application Priority Data
Jan. 21, 2016 (JP) .................. 2016-010044

(51) Int. Cl.
*B60S 1/18* (2006.01)
*B60S 1/24* (2006.01)
*B60S 1/08* (2006.01)

(52) U.S. Cl.
CPC .............. *B60S 1/18* (2013.01); *B60S 1/0814* (2013.01); *B60S 1/24* (2013.01)

(58) Field of Classification Search
None
See application file for complete search history.

(56) References Cited

U.S. PATENT DOCUMENTS

| 4,707,641 A | 11/1987 | Guerard et al. |
| 5,306,991 A | 4/1994 | Suzuki |

(Continued)

FOREIGN PATENT DOCUMENTS

| JP | H11-227572 A | 8/1999 |
| JP | 2000-25578 A | 1/2000 |

(Continued)

OTHER PUBLICATIONS

Non-Final Office Action issued in pending U.S. Appl. No. 16/070,529 dated May 13, 2019.

*Primary Examiner* — Eric W Golightly
(74) *Attorney, Agent, or Firm* — Solaris Intellectual Property Group, PLLC

(57) ABSTRACT

A vehicle wiper device and vehicle wiper device control method are provided that are capable of changing a position of a wiping range of a wiper arm in a manner that is less distracting.

When a switch for an enlarged wiping operation has been switched ON, a microcomputer 58 performs control to change the position of a wiping range by starting rotation of an output shaft of a second motor 12 in a predetermined direction when a rotation angle of an output shaft of a first motor 11 has reached an angle corresponding to a position within a predetermined range in the vicinity of one out of a upper return position P1P or a lower return position P2P. Accordingly, when a front passenger seat side wiper blade 36 changes direction at either the upper return position P1P or the lower return position P2P, a front passenger seat side wiper arm 35 begins to extend, and the position of a wiping range of the front passenger seat side wiper blade 36 is moved upward on a front passenger seat side.

12 Claims, 17 Drawing Sheets

(56) References Cited

U.S. PATENT DOCUMENTS

| | | |
|---|---|---|
| 2004/0136568 A1 | 7/2004 | Milgram et al. |
| 2005/0035926 A1 | 2/2005 | Takenaga et al. |
| 2005/0117358 A1 | 6/2005 | Fukawa et al. |
| 2009/0248251 A1 | 10/2009 | Sugimoto |
| 2014/0298607 A1 | 10/2014 | Yasumoto et al. |

FOREIGN PATENT DOCUMENTS

| | | | |
|---|---|---|---|
| JP | 2001106031 A | * | 4/2001 |
| JP | 2003-220929 A | | 8/2003 |
| JP | 2005-104337 A | | 4/2005 |
| JP | 2005-206032 A | | 8/2005 |
| JP | 2010264931 A | * | 11/2010 |
| JP | 2012-20625 A | | 2/2012 |
| JP | 2012-224231 A | | 11/2012 |
| JP | 2014-83993 A | | 5/2014 |

* cited by examiner

VEHICLE WIPER DEVICE AND VEHICLE WIPER DEVICE CONTROL METHOD

TECHNICAL FIELD

Technology disclosed herein relates to a vehicle wiper device and a vehicle wiper device control method capable of changing the position of a wiping range.

BACKGROUND ART

In vehicle wiper devices that wipe the glass of a windshield or the like in an automobile, a wiper motor moves a wiper blade with an attached wiper arm back and forth between a lower return position and an upper return position. The movement of the wiper arm most often forms a substantially circular arc shaped trajectory centered on a pivot shaft of the wiper arm. A wiping range, this being a region where the windshield glass or the like is wiped by the wiper blade, accordingly has a fan-like shape centered on the pivot shaft.

In vehicle wiper devices, it is necessary to prioritize wiping of the windshield glass on the side of a driver's seat in order to secure the driver's field of view. Moreover, the windshield glass of an automobile is substantially in the shape of an isosceles trapezoid. Therefore, in parallel (tandem) wiper devices in which two wiper arms swing at the same time and in the same direction as each other, in cases in which the pivot shafts are provided below the windshield glass, an upper return position of the wiper blade on the driver's seat side is provided at a position alongside and close to a driver's seat side edge of the isosceles trapezoid shaped windshield glass (one upright side of the isosceles trapezoid shape).

In order to prioritize wiping of the driver's seat side of the windshield glass, in a tandem wiper device, the upper return position of the wiper blade on the front passenger seat side is also provided alongside the driver's seat side edge of the windshield glass. However, as described above, since the wiping ranges of the wiper blades are substantially fan shaped, providing the upper return positions at the positions described above results in a region that is not wiped, centered on an upper corner on the front passenger seat side of the windshield glass.

Japanese Patent Application Laid-Open (JP-A) No. 2000-25578 discloses a wiper device that employs a four-piece link mechanism as a link mechanism of the wiper device. The four-piece link mechanism changes the position of a wiping range on a front passenger seat side of windshield glass by moving a wiper arm into the non-wiped region described above while the wiper arm is in operation.

As illustrated in FIG. 15, the wiper device described in JP-A No. 2000-25578 transmits drive force of a motor through a four-piece link mechanism 160 to a front passenger seat side wiper arm 150P, such that a front passenger seat side wiper blade 154P wipes a wiping range Z12 between a lower return position P4P and an upper return position P3P. In FIG. 15, the wiping range Z10 would be the wiping range of the wiper arm moving about the pivot shaft if the wiper device did not include the four-piece link mechanism 160. As illustrated in FIG. 15, the wiper device described in JP-A No. 2000-25578 is capable of wiping up to an area closer to an upper corner on the front passenger seat side of a windshield glass 1 than a wiper device that does not include the four-piece link mechanism 160.

SUMMARY OF INVENTION

Technical Problem

However, in the wiper device described in JP-A No. 2000-25578, as illustrated in FIG. 15, the movement of the operating front passenger seat side wiper arm toward a region that is not wiped is not sufficient, and there is a concern of a non-wiped region 158 arising where an upper portion of the front passenger seat side of the windshield glass 1 is left unwiped. In order to suppress such a non-wiped region 158, it is possible to conceive of a wiping adjustment operation to change the position of the wiping range Z12 to include the non-wiped region 158.

However, without constraining such a wiping adjustment operation, the change in the position of the wiping range Z12 might be distracting to some occupants.

In consideration of the above circumstances, an object of the present disclosure is to provide a vehicle wiper device and vehicle wiper device control method capable of reducing distraction caused by a change in the position of a wiping range of a wiper arm.

Solution to Problem

In order to address the above issue, a vehicle wiper device of a first aspect of the present disclosure includes a first motor, a second motor, and a controller. The first motor includes a first output shaft, rotates the first output shaft to rotate a wiper arm back and forth about a pivot point of the wiper arm, and causes a wiper blade coupled to a leading end portion of the wiper arm to perform a back and forth wiping operation between two return positions provided at different positions to each other on a windshield. The second motor includes a second output shaft and rotates the second output shaft to change a position of a wiping range of the windshield by the wiper blade. The controller controls rotation of the second motor when a command to operate the second motor has been input during the wiping operation of the wiper blade so as to start operation of the second motor when the wiper blade performing the wiping operation is positioned within a predetermined range in the vicinity of one of the two return positions.

The second motor according to this vehicle wiper device is a drive source used to change the position of the wiping range where the windshield is wiped by the wiper blade. Changing the position of the wiping range where the windshield is wiped by the wiper blade enables the wiper blade to wipe as far as a region close to an upper corner on a front passenger seat side of the windshield.

In this vehicle wiper device, when a command to operate the second motor has been input from an operation switching section, operation of the second motor is started when the wiper blade is positioned within the predetermined range in the vicinity of one of the two return positions. This thereby enables the change in the position of the wiper arm to be started when the wiper blade has reached the predetermined range in the vicinity of one of the two return positions and has changed direction, enabling the position of the wiping range of the wiper arm to be changed in a manner that is less distracting.

A vehicle wiper device of a second aspect of the present disclosure is the vehicle wiper device of the first aspect, wherein the second output shaft of the second motor is coupled to the wiper arm through a link mechanism, and the second motor rotates the second output shaft to move the pivot point of the wiper arm between a first position and a second position separate from and above the first position on a front passenger seat side. Moreover, when a command to operate the second motor is input during the wiping operation of the wiper blade, the controller controls rotation of the second motor so as to start operation of the second motor when the wiper blade performing the wiping operation is positioned within a predetermined range in the vicinity of one of the two return positions, and such that the pivot point of the wiper arm moves back and forth between the first position and the second position by the time the wiper blade reaches the other of the two return positions.

In this vehicle wiper device, the position of the wiping range of the wiper arm is changed by moving the pivot point of the wiper arm back and forth between the first position and the second position that is separate from and above the first position on the front passenger seat side in the time it takes for the wiper blade to move from one return position to the other return position.

A vehicle wiper device of a third aspect of the present disclosure is the vehicle wiper device of the second aspect, further including a rotation angle detector that detects a rotation angle of the first output shaft. Moreover, when a command to operate the second motor has been input, the controller controls rotation of the second output shaft so as to move the pivot point of the wiper arm from the first position to the second position between when the rotation angle of the first output shaft detected by the rotation angle detector reaches an angle corresponding to a predetermined range in the vicinity of one of the two return positions and when the rotation angle of the first output shaft detected by the rotation angle detector reaches an angle corresponding to an intermediate position between the two return positions, and also controls rotation of the second output shaft to move the pivot point of the wiper arm from the second position to the first position between when the rotation angle of the first output shaft detected by the rotation angle detector reaches an angle corresponding to an intermediate position between the two return positions and when the rotation angle of the first output shaft detected by the rotation angle detector reaches an angle corresponding to the other of the two return positions.

In this vehicle wiper device, the output shaft of the second motor is rotated to move the pivot point of the wiper arm from the first position to the second position between when the rotation angle of the output shaft of the first motor reaches an angle corresponding to the predetermined range in the vicinity of one of the two return positions, and when the rotation angle of the output shaft of the first motor reaches an angle (intermediate angle) corresponding to an intermediate position between the two return positions, namely in the time it takes for the wiper blade to reach a point between the two return positions.

In this vehicle wiper device, the second motor is rotated and the pivot point of the wiper arm is moved back to its original position between when the rotation angle of the output shaft of the first motor detected by the rotation angle detector reaches the intermediate angle and when the rotation angle of the output shaft of the first motor detected by the rotation angle detector reaches the angle corresponding to the other of the two return positions. By returning the position of the pivot point of the wiper arm to its original position by the time the wiper blade reaches the other of the two return positions, this vehicle wiper device enables the position of the wiping range of the front passenger seat side of the windshield to be changed without interruption.

A vehicle wiper device of a fourth aspect of the present disclosure is the vehicle wiper device of any one of the first aspect to the third aspect, further including a degree changing section that is configured to change a degree to which the position of the wiping range of the wiper arm is changed and that outputs a signal indicating the degree changed. Moreover, the controller controls rotation of the second motor based on a rotation angle of the second output shaft corresponding to the degree indicated by a signal input from an enlargement ratio changing section.

According to this vehicle wiper device, the change in the position of the wiping range is suppressed by changing the rotation angle of the output shaft of the second motor according to the degree that is input, thereby enabling the position of the wiping range of the wiper arm to be changed in a manner that is less distracting.

A vehicle wiper device of a fifth aspect of the present disclosure is the vehicle wiper device of the fourth aspect of the present disclosure, wherein the controller determines a rotation angle of the second output shaft corresponding to the degree, based on the degree and on a rotation angle control map defining rotation angles of the second output shaft against rotation angles of the first output shaft.

In this vehicle wiper device, the rotation angle control map that defines change in the rotation angle of the output shaft of the second motor against rotation angles of the output shaft of the first motor is employed, thereby enabling rotation of the output shaft of the second motor to be synchronized with rotation of the output shaft of the first motor.

In order to address the above issue, a vehicle wiper device control method of a sixth aspect of the present disclosure includes a step of starting rotation of a first output shaft of a first motor. The first motor that includes the first output shaft and rotates the first output shaft so as to rotate a wiper arm about a pivot point of the wiper arm such that a wiper blade coupled to a leading end portion of the wiper arm performs a wiping operation between two return positions provided at different positions to each other on a windshield. The vehicle wiper device control method also includes a second motor operation command detection step of detecting a command to operate a second motor. The second motor includes a second output shaft and rotates the second output shaft to change a position of a wiping range of the windshield by the wiper blade. The vehicle wiper device control method also includes a wiping range position changing step of controlling rotation of the second motor when a command to operate the second motor has been detected during the wiping operation of the wiper blade, so as to start operation of the second motor when the wiper blade performing the wiping operation is positioned within a predetermined range in the vicinity of one of the two return positions.

In this vehicle wiper device control method, the second motor is a drive source used to change the position of the wiping range where the windshield is wiped by the wiper blade. Changing the position of the wiping range where the windshield is wiped by the wiper blade enables the wiper blade to wipe as far as a region close to an upper corner on a front passenger seat side of the windshield.

Moreover, in this vehicle wiper device control method, when a command to operate the second motor has been detected, operation of the second motor is started when the wiper blade is positioned within the predetermined range in the vicinity of one of the two return positions provided at different positions to each other on the windshield. This thereby enables extension of the wiper arm to be started when the wiper blade has changed direction at either of the two return positions, enabling the position of the wiping range of the wiper arm to be changed in a manner that is less distracting.

A vehicle wiper device control method of a seventh aspect of the present disclosure is the vehicle wiper device control method of the sixth aspect, wherein at the wiping range position changing step, when a command to operate the second motor has been detected at the second motor operation command detection step, operation of the second motor of which the second output shaft is coupled to the wiper arm through a link mechanism is started when the wiper blade performing the wiping operation is positioned within a predetermined range in the vicinity of one of the two return positions, and rotation of the second motor is controlled such that the pivot point of the wiper arm is moved back and forth between a first position and a second position separate from and above the first position on a front passenger seat side by rotation of the second output shaft by the time the wiper blade reaches the other of the two return positions.

In this vehicle wiper device control method, the position of the wiping range of the wiper arm is changed by moving the pivot point of the wiper arm back and forth between the first position and the second position that is separate from and above the first position on the front passenger seat side in the time it takes for the wiper blade to move from one return position to the other return position.

A vehicle wiper device control method of an eighth aspect of the present disclosure is the vehicle wiper device control method of the seventh aspect, further including a rotation angle detection step of detecting a rotation angle of the first output shaft. Moreover, when a command to operate the second motor has been detected at the second motor operation command detection step, at the wiping range position changing step, control is performed to rotate the second output shaft such that the pivot point of the wiper arm is moved from the first position to the second position between when the rotation angle of the first output shaft detected at the rotation angle detection step reaches an angle corresponding to a position within a predetermined range in the vicinity of one of the two return positions and when the rotation angle of the first output shaft detected at the rotation angle detection step reaches an angle corresponding to an intermediate position between the two return positions, and control is performed to rotate the second output shaft such that the pivot point of the wiper arm moves from the second position to the first position between when the rotation angle of the first output shaft detected at the rotation angle detection step reaches an angle corresponding to an intermediate position between the two return positions and when the rotation angle of the first output shaft detected at the rotation angle detection step reaches an angle corresponding to the other of the two return positions.

In this vehicle wiper device control method, the second motor is rotated to move the pivot point of the wiper arm from the first position to the second position between when the rotation angle of the output shaft of the first motor reaches an angle corresponding to a position within the predetermined range in the vicinity of one of the two return positions, and when the rotation angle of the output shaft of the first motor reaches an angle (intermediate angle) corresponding to an intermediate position between the two return positions, namely in the time it takes for the wiper blade to reach a point between the two return positions.

In this vehicle wiper device control method, the second motor is rotated in the opposite direction to a predetermined direction and the pivot point of the wiper arm is moved back to its original position between when the rotation angle of the output shaft of the first motor reaches the intermediate angle and when the rotation angle of the output shaft of the first motor reaches the angle corresponding to the other of the two return positions. By returning the position of the pivot point of the wiper arm to its original position by the time the wiper blade reaches the other of the two return positions, this vehicle wiper device control method enables the position of the wiping range of the front passenger seat side of the windshield to be changed without interruption.

A vehicle wiper device control method of a ninth aspect of the present disclosure is the vehicle wiper device control method of any one of the sixth aspect to the eighth aspect, further including a degree detection step of detecting a signal indicating a degree of change to a position of the wiper arm. Moreover, at the wiping range position changing step, rotation of the second motor is controlled based on a rotation angle of the second output shaft corresponding to the degree detected at the degree detection step.

According to this vehicle wiper device control method, the change in the position of the wiping range is suppressed by changing the rotation angle of the output shaft of the second motor according to the degree that is input, thereby enabling the position of the wiping range of the wiper arm to be changed in a manner that is less distracting.

A vehicle wiper device control method of a tenth aspect of the present disclosure is the vehicle wiper device control method of the ninth aspect, wherein at the wiping range position changing step, a rotation angle of the second output shaft corresponding to the degree is determined based on the degree and on a rotation angle control map defining rotation angles of the second output shaft against rotation angles of the first output shaft.

In this vehicle wiper device control method, the rotation angle control map that defines change in the rotation angle of the output shaft of the second motor against rotation angles of the output shaft of the first motor is employed, thereby enabling rotation of the output shaft of the second motor to be synchronized with rotation of the output shaft of the first motor.

A vehicle wiper device of an eleventh aspect of the present disclosure is the vehicle wiper device of the third aspect, wherein the controller controls rotation of the first motor and rotation of the second motor so as to progressively reduce a rotation speed of the first output shaft and a rotation speed of the second output shaft as a rotation angle of the first output shaft detected by the rotation angle detector approaches an angle corresponding to an intermediate position between the two return positions after reaching an angle corresponding to a predetermined range in the vicinity of one of the two return positions.

A vehicle wiper device control method of a twelfth aspect of the present disclosure is the vehicle wiper device control method of the third aspect, wherein at the wiping range position changing step, rotation of the first motor and rotation of the second motor are controlled so as to progressively reduce a rotation speed of the first output shaft and a rotation speed of the second output shaft as a rotation angle of the first output shaft detected at the rotation angle detection step approaches an angle corresponding to an intermediate position between the two return positions after reaching an angle corresponding to a predetermined range in the vicinity of one of the two return positions.

DESCRIPTION OF EMBODIMENTS

Figure 1:
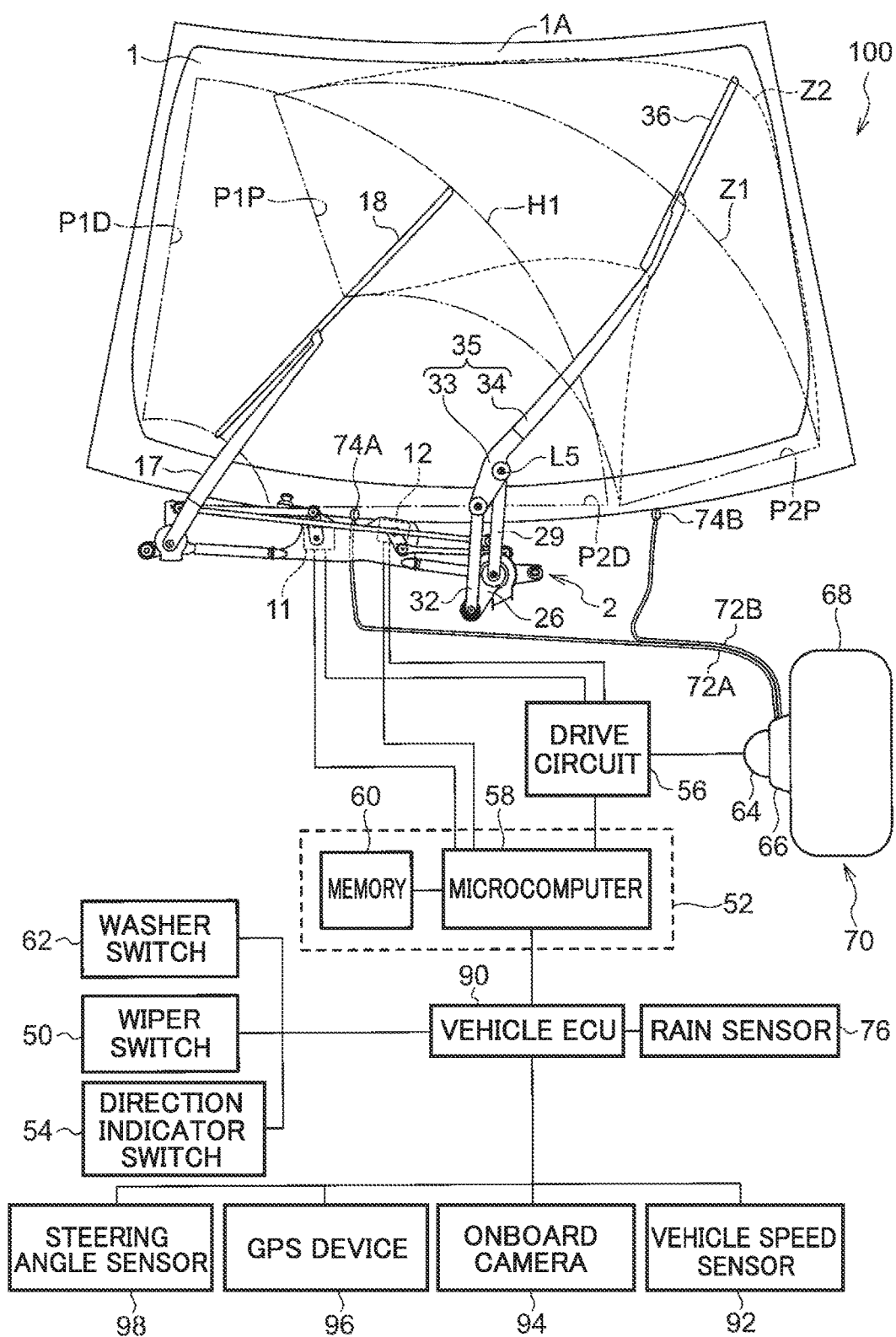
FIG. 1 is a schematic view illustrating an example of a vehicle wiper system including a vehicle wiper device according to an exemplary embodiment of technology disclosed herein.

FIG. 1 is a schematic view illustrating an example of a wiper system 100 including a vehicle wiper device (referred to hereafter as "wiper device") 2 according to an exemplary embodiment of technology disclosed herein. The wiper system 100 illustrated in FIG. 1 is used to wipe a windshield glass 1, serving as a "windshield", provided to a vehicle such as a passenger car. The wiper system 100 is configured including a pair of wiper arms (a driver's seat side wiper arm 17 and a front passenger seat side wiper arm 35, described later), a first motor 11, a second motor 12, a control circuit 52, a drive circuit 56, and a washer device 70.

FIG. 1 illustrates an example of a right-hand drive vehicle, in which the right side of the vehicle (the left side in FIG. 1) is a driver's seat side, and the left side of the vehicle (the right side in FIG. 1) is a front passenger seat side. In the case of a left-hand drive vehicle, the left side of the vehicle (the right side in FIG. 1) would be the driver's seat side, and the right side of the vehicle (the left side in FIG. 1) would be the front passenger seat side. In the case of a left-hand drive vehicle, the configuration of the wiper device 2 would be reversed in the left-right direction.

The first motor 11 is a drive source that rotates an output shaft forward and backward over a predetermined rotation angle range in order to move the driver's seat side wiper arm 17 and the front passenger seat side wiper arm 35 back and forth over the windshield glass 1. In the present exemplary embodiment, when the first motor 11 rotates forward, a driver's seat side wiper blade 18 of the driver's seat side wiper arm 17 moves so as to wipe from a lower return position P2D to an upper return position P1D, and a front passenger seat side wiper blade 36 of the front passenger seat side wiper arm 35 moves so as to wipe from a lower return position P2P to an upper return position P1P. Moreover, when the first motor 11 rotates backward, the driver's seat side wiper blade 18 of the driver's seat side wiper arm 17 moves so as to wipe from the upper return position P1D to the lower return position P2D, and the front passenger seat side wiper blade 36 of the front passenger seat side wiper arm 35 moves so as to wipe from the upper return position P1P to the lower return position P2P.

An outer edge portion of the windshield glass 1 is configured by a light-blocking portion 1A that is coated with a black ceramic pigment to block visible light and ultraviolet light. The black pigment is coated onto the outer edge portion at a vehicle cabin inside of the windshield glass 1, and is then heat treated at a predetermined temperature such that the pigment melts and fixes to the vehicle cabin inside surface of the windshield glass 1. The windshield glass 1 is fixed to a vehicle body using an adhesive applied to the outer edge portion. As illustrated in FIG. 1, providing the outer edge portion with the light-blocking portion 1A that does not allow ultraviolet light to pass through suppresses ultraviolet deterioration of the adhesive.

When the second motor 12, described later, is not operating, the output shaft of the first motor 11 (a first output shaft 11A, described later) is rotated forward and rotated backward over a rotation angle between 0° and a predetermined rotation angle (referred to hereafter as a "first predetermined rotation angle"), such that the driver's seat side wiper blade 18 wipes a wiping range H1, and the front passenger seat side wiper blade 36 wipes a wiping range Z1.

The second motor 12 is a drive source that rotates an output shaft (a second output shaft 12A, described later) of the second motor 12 forward and backward over a rotation angle between 0° and a predetermined rotation angle (referred to hereafter as a "second predetermined rotation angle"), in order to give the appearance of extending the front passenger seat side wiper arm 35. Operating the second motor 12 while the mentioned first motor 11 is in operation gives the appearance of extending the front passenger seat side wiper arm 35 upward on the front passenger seat side, such that the front passenger seat side wiper blade 36 wipes a wiping range Z2. Moreover, changing the size of the second predetermined rotation angle enables the range of the extension of the front passenger seat side wiper arm 35 to be adjusted. For example, setting a large second predetermined rotation angle increases the range of the extension of the front passenger seat side wiper arm 35, and setting a small second predetermined rotation angle decreases the range of the extension of the front passenger seat side wiper arm 35.

The first motor 11 and the second motor 12 are capable of controlling the rotation directions of their respective output shafts so as to rotate forward or rotate backward. The first motor 11 and the second motor 12 are also capable of controlling the rotation speeds of their respective output shafts. The first motor 11 and the second motor 12 are, for example, either brushed DC motors or brushless DC motors.

The control circuit 52 is connected to the first motor 11 and the second motor 12 so as to control the rotation of the first motor 11 and the second motor 12. For example, the control circuit 52 according to the present exemplary embodiment computes duty ratios of voltages to be applied to the first motor 11 and the second motor 12 based on the rotation directions, rotation positions, rotation speeds, and rotation angles of the output shafts of the first motor 11 and the second motor 12, detected by absolute angle sensors (not illustrated in the drawings), serving as "rotation angle detectors", provided in the vicinity of terminal ends of the output shafts of the first motor 11 and the second motor 12.

In the present exemplary embodiment, the voltages applied to the first motor 11 and the second motor 12 are generated by pulse width modulation (PWM) that modulates a pulse waveform by using a switch device to switch a voltage (approximately 12V) of an onboard battery, serving as a power source, ON and OFF. The duty ratio of the present exemplary embodiment is the duration of a single pulse generated when the switch device is ON proportionate to the duration of a single period of the waveform of the voltage generated by PWM. Moreover, a single period of the waveform of the voltage generated by the PWM is the sum of the duration of the single pulse and the duration in which the switch device is OFF and no pulse is generated. The drive circuit 56 generates voltages to be applied to the first motor 11 and the second motor 12 by switching a switch device ON and OFF in the drive circuit 56 according to the duty ratios computed by the control circuit 52. The drive circuit 56 applies the generated voltages to coil terminals of the first motor 11 and the second motor 12.

The first motor 11 and the second motor 12 according to the present exemplary embodiment each include a speed reduction mechanism configured by a worm gear. Accordingly, the rotation directions, rotation speeds, and rotation angles of the respective output shafts are not the same as the rotation speeds and rotation angles in a body of the first motor 11 and a body of the second motor 12. However, since the speed reduction mechanism of each motor is integral and non-removable in the present exemplary embodiment, hereafter, the rotation speeds and rotation angles of the output shafts of the first motor 11 and the second motor 12 will be considered to be the rotation directions, rotation speeds, and rotation angles of the first motor 11 and the second motor 12 respectively.

The absolute angle sensors are, for example, provided within the speed reduction mechanisms of the first motor 11 and the second motor 12, and are sensors that convert the magnetic fields (magnetic force) of an excitation coil or magnet rotating together with the respective output shaft into current and detect this current. For example, the absolute angle sensors are magnetic sensors such as MR sensors.

The control circuit 52 includes a microcomputer 58 that is capable of computing the position of the driver's seat side wiper blade 18 on the windshield glass 1 based on the rotation angle of the output shaft of the first motor 11, as detected by the absolute angle sensor provided in the vicinity of the terminal end of the output shaft of the first motor. The microcomputer 58 controls the drive circuit 56 so as to change the rotation speed of the output shaft of the first motor 11 according to the computed position.

The microcomputer 58 also computes the position of the front passenger seat side wiper blade 36 on the windshield glass 1 based on the rotation angle of the output shaft of the first motor 11, as detected by the absolute angle sensor provided in the vicinity of the terminal end of the output shaft of the first motor, and controls the drive circuit 56 so as to change the rotation speed of the output shaft of the second motor 12 according to the computed position. The microcomputer 58 also computes an amount of extension of the front passenger seat side wiper arm 35 based on the rotation angle of the output shaft of the second motor 12 as detected by the absolute angle sensor provided in the vicinity of the terminal end of the output shaft of the second motor 12.

The control circuit 52 is provided with memory 60, this being a storage device stored with data and a program employed in controlling the drive circuit 56. The memory 60 is stored with data and a program used to compute rotation speeds and the like (including the rotation angles) of the output shafts of the first motor 11 and the second motor 12 according to the rotation angle of the output shaft of the first motor 11, this representing the positions of the driver's seat side wiper blade 18 and the front passenger seat side wiper blade 36 on the windshield glass 1.

A vehicle Electronic Control Unit (ECU) 90 that performs overall control of a vehicle engine and the like is connected to the microcomputer 58. Also connected to the vehicle ECU 90 are a wiper switch 50, a direction indicator switch 54, a washer switch 62, a rain sensor 76, a vehicle speed sensor 92 that detects the speed of the vehicle, an onboard camera 94 that captures images ahead of the vehicle, a Global Positioning System (GPS) device 96, and a steering angle sensor 98.

The wiper switch 50 is a switch that switches power supply from the vehicle battery to the first motor 11 ON and OFF. The wiper switch 50 is capable of switching between a low speed actuation mode selection position for actuating the driver's seat side wiper blade 18 and the front passenger seat side wiper blade 36 at low speed, a high speed actuation mode selection position for actuating the driver's seat side wiper blade 18 and the front passenger seat side wiper blade 36 at high speed, an intermittent actuation mode selection position for actuating the driver's seat side wiper blade 18 and the front passenger seat side wiper blade 36 intermittently at a fixed period, an AUTO actuation mode selection position for actuating the driver's seat side wiper blade 18 and the front passenger seat side wiper blade 36 when raindrops have been detected by the rain sensor 76, and a stowed (inactive) mode selection position. Signals corresponding to the selection positions for each mode are output to the microcomputer 58 via the vehicle ECU 90.

When a signal corresponding to the selection position of the respective mode is output from the wiper switch 50 and input to the microcomputer 58 via the vehicle ECU 90, the microcomputer 58 uses the data and program stored in the memory 60 to perform control corresponding to the signal output from the wiper switch 50.

In the present exemplary embodiment, the wiper switch 50 is provided with a separate enlargement mode switch that is used to change the wiping range of the front passenger seat side wiper blade 36 to the wiping range Z2. When the enlargement mode switch is ON, a predetermined signal is input to the microcomputer 58 via the vehicle ECU 90. When the predetermined signal is input to the microcomputer 58, if, for example, the front passenger seat side wiper blade 36 is moving from the lower return position P2P toward the upper return position P1P, the microcomputer 58 controls the second motor 12 so as to wipe over the wiping range Z2.

The direction indicator switch 54 is a switch used to instruct actuation of a direction indicator (not illustrated in the drawings) of the vehicle. The direction indicator switch 54 is operated by the driver to output a signal to switch ON a left or right direction indicator to the vehicle ECU 90. Based on the signal output from the direction indicator switch 54, the vehicle ECU 90 causes a lamp of the left or right direction indicator to flash. The signal output from the direction indicator switch 54 is also input to the microcomputer 58 via the vehicle ECU 90.

The washer switch 62 is a switch used to switch ON or OFF power supply from the vehicle battery to a washer motor 64, the first motor 11, and the second motor 12. For example, the washer switch 62 is integrally provided to an operation means such as a lever provided to the wiper switch 50 described above, and is switched ON by a manual operation to pull the lever toward an occupant. When the washer switch 62 is switched ON, the microcomputer 58 actuates the washer motor 64 and the first motor 11. The microcomputer 58 also controls the second motor 12 such that the front passenger seat side wiper blade 36 wipes over the wiping range Z2 when the front passenger seat side wiper blade 36 is moving so as to wipe from the lower return position P2P to the upper return position P1P, and controls the second motor 12 such that the front passenger seat side wiper blade 36 wipes over the wiping range Z1 when the front passenger seat side wiper blade 36 is moving so as to wipe from the upper return position P1P to the lower return position P2P. This control enables the front passenger seat side of the windshield glass 1 to be wiped over a wide area.

While the washer switch 62 is ON, rotation of the washer motor 64 provided to the washer device 70 drives a washer pump 66. The washer pump 66 conveys washer liquid under pressure from a washer liquid tank 68 to either a driver's seat side hose 72A or a front passenger seat side hose 72B. The driver's seat side hose 72A is connected to a driver's seat side nozzle 74A provided beneath the windshield glass 1 on the driver's seat side. The front passenger seat side hose 72B is connected to a front passenger seat side nozzle 74B provided beneath the windshield glass 1 on the front passenger seat side. The washer liquid that has been conveyed under pressure is squirted onto the windshield glass 1 from the driver's seat side nozzle 74A and the front passenger seat side nozzle 74B. Washer liquid that has landed on the windshield glass 1 is wiped away, together with dirt on the windshield glass 1, by the movement of the driver's seat side wiper blade 18 and the front passenger seat side wiper blade 36.

The microcomputer 58 controls such that the washer motor 64 is only actuated while the washer switch 62 is ON. The microcomputer 58 also controls the first motor 11 such that even when the washer switch 62 has been switched OFF, the driver's seat side wiper blade 18 and the front passenger seat side wiper blade 36 continue moving until they reach the lower return positions P2D, P2P. The microcomputer 58 also controls the second motor 12 such that if the washer switch 62 is switched OFF while the driver's seat side wiper blade 18 and the front passenger seat side wiper blade 36 are wiping toward the upper return positions P1D, P1P, the wiping range Z2 is wiped until the driver's seat side wiper blade 18 and the front passenger seat side wiper blade 36 rotated by the first motor 11 reach the upper return positions P1D, P1P.

The rain sensor 76 is, for example, a type of optical sensor provided at the vehicle cabin inside of the windshield glass 1, and detects water droplets and the like on the surface of the windshield glass 1. For example, the rain sensor 76 includes an LED, this being an infrared optical device, a photodiode, this being a light receiving element, a lens that forms a path of infrared light, and a control circuit. Infrared emitted from the vehicle cabin inside toward the vehicle outside by the LED is totally reflected by the windshield glass 1. However, if water droplets are present on the surface of the windshield glass 1, part of the infrared passes through the water droplets and is released to the outside, reducing the amount of reflection by the windshield glass 1. The amount of light that enters the photodiode, this being the light receiving element, therefore decreases. This reduction in the amount of light is used to detect water droplets on the surface of the windshield glass 1.

The vehicle speed sensor 92 is a sensor that detects a revolution speed of a wheel of the vehicle, and outputs a signal indicating this revolution speed. The vehicle ECU 90 computes the vehicle speed based on the signal output by the vehicle speed sensor 92 and the circumference of the wheel.

The onboard camera 94 is a device that acquires video data by capturing images ahead of the vehicle. The vehicle ECU 90 is capable of performing image processing on the video data acquired by the onboard camera 94 in order to determine, for example, if the vehicle is entering a curve in the road. The vehicle ECU 90 is also capable of computing the brightness ahead of the vehicle based on the luminance of the video data acquired by the onboard camera 94.

Note that the rain sensor 76 and the onboard camera 94 are provided on the vehicle cabin inside of the windshield glass 1. The rain sensor 76 detects raindrops and the like on the windshield glass 1 from the vehicle cabin inside through the windshield glass 1, and the onboard camera 94 captures images ahead of the vehicle through the windshield glass 1.

The GPS device is a device that computes a current position of the vehicle based on location signals received from a GPS satellite up above. In the present exemplary embodiment, the wiper system 100 employs a dedicated GPS device 96. However, other GPS devices may be employed in cases in which the vehicle is provided with other GPS devices such as a car navigation system.

The steering angle sensor 98 is, for example, provided to a steering wheel rotation shaft (not illustrated in the drawings), and is a sensor that detects a rotation angle of the steering wheel.

Explanation follows regarding configuration of the wiper device 2 according to the present exemplary embodiment, with reference to FIG. 2 to FIG. 8. As illustrated in FIG. 2 and FIG. 4 to FIG. 8, the wiper device 2 according to the present exemplary embodiment includes a plate-shaped central frame 3, and a pair of pipe frames 4, 5 that are each fixed to the central frame 3 at one end portion, and extend from the central frame 3 toward one or the other vehicle width direction side. Another end portion of the pipe frame 4 is formed with a first holder member 6 that includes a driver's seat side pivot shaft 15 and so on of the driver's seat side wiper arm 17. Another end portion of the pipe frame 5 is formed with a second holder member 7 that includes a second front passenger seat side pivot shaft 22 and so on of the front passenger seat side wiper arm 35. The wiper device 2 is supported on the vehicle at a support portion 3A provided to the central frame 3, and is fixed to the vehicle by fastening to the vehicle using bolts or the like at a fixing portion 6A of the first holder member 6 and at a fixing portion 7A of the second holder member 7.

The first motor 11 and the second motor 12 that drive the wiper device 2 are provided to the wiper device 2 at a back face of the central frame 3 (at a face that faces into the vehicle cabin). The first output shaft 11A of the first motor 11 passes through the central frame 3 and projects from a front face of the central frame 3 (a face that faces toward the outside of the vehicle). One end of a first drive crank arm 13 is fixed to a leading end portion of the first output shaft 11A. The second output shaft 12A of the second motor 12 passes through the central frame 3 and projects from the front face of the central frame 3. One end of a second drive crank arm 14 is fixed to a leading end portion of the second output shaft 12A.

The driver's seat side pivot shaft 15 is rotatably supported by the first holder member 6. One end of a driver's seat side swing lever 16 is fixed to a base end portion of the driver's seat side pivot shaft 15 (on the far side in FIG. 2), and an arm head of the driver's seat side wiper arm 17 is fixed to a leading end portion of the driver's seat side pivot shaft 15 (on the near side in FIG. 2). As illustrated in FIG. 1, the driver's seat side wiper blade 18 for wiping the driver's seat side of the windshield glass 1 is coupled to a leading end portion of the driver's seat side wiper arm 17.

The other end of the first drive crank arm 13 and the other end of the driver's seat side swing lever 16 are coupled together through a first coupling rod 19. When the first motor 11 is driven, the first drive crank arm 13 rotates, and this rotation force is transmitted through the first coupling rod 19 to the driver's seat side swing lever 16, causing the driver's seat side swing lever 16 to swing. Swinging the driver's seat side swing lever 16 also swings the driver's seat side wiper arm 17, such that the driver's seat side wiper blade 18 wipes the wiping range H1 between the lower return position P2D and the upper return position P1D.

Figure 2:
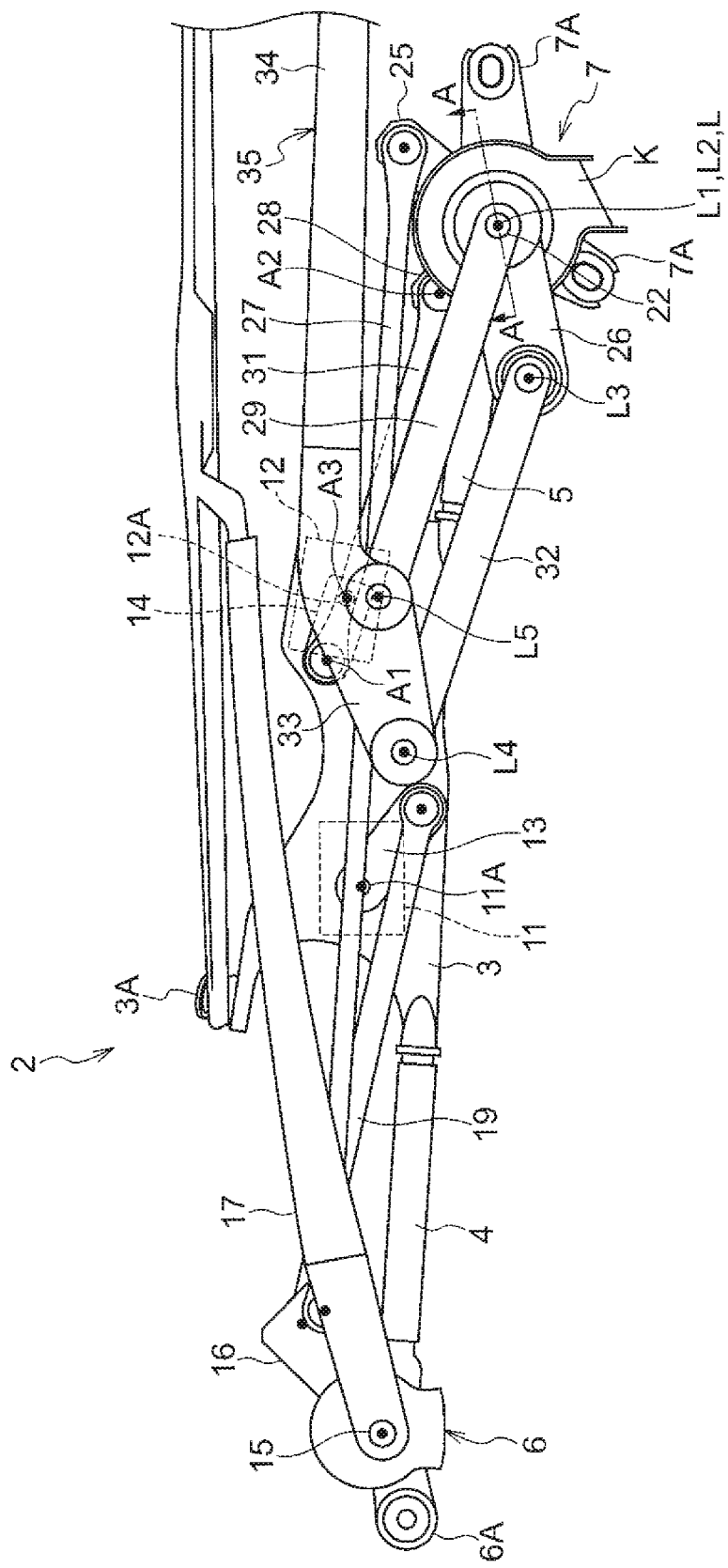
FIG. 2 is a plan view illustrating an inactive state of a vehicle wiper device according to an exemplary embodiment of technology disclosed herein.
Figure 3:
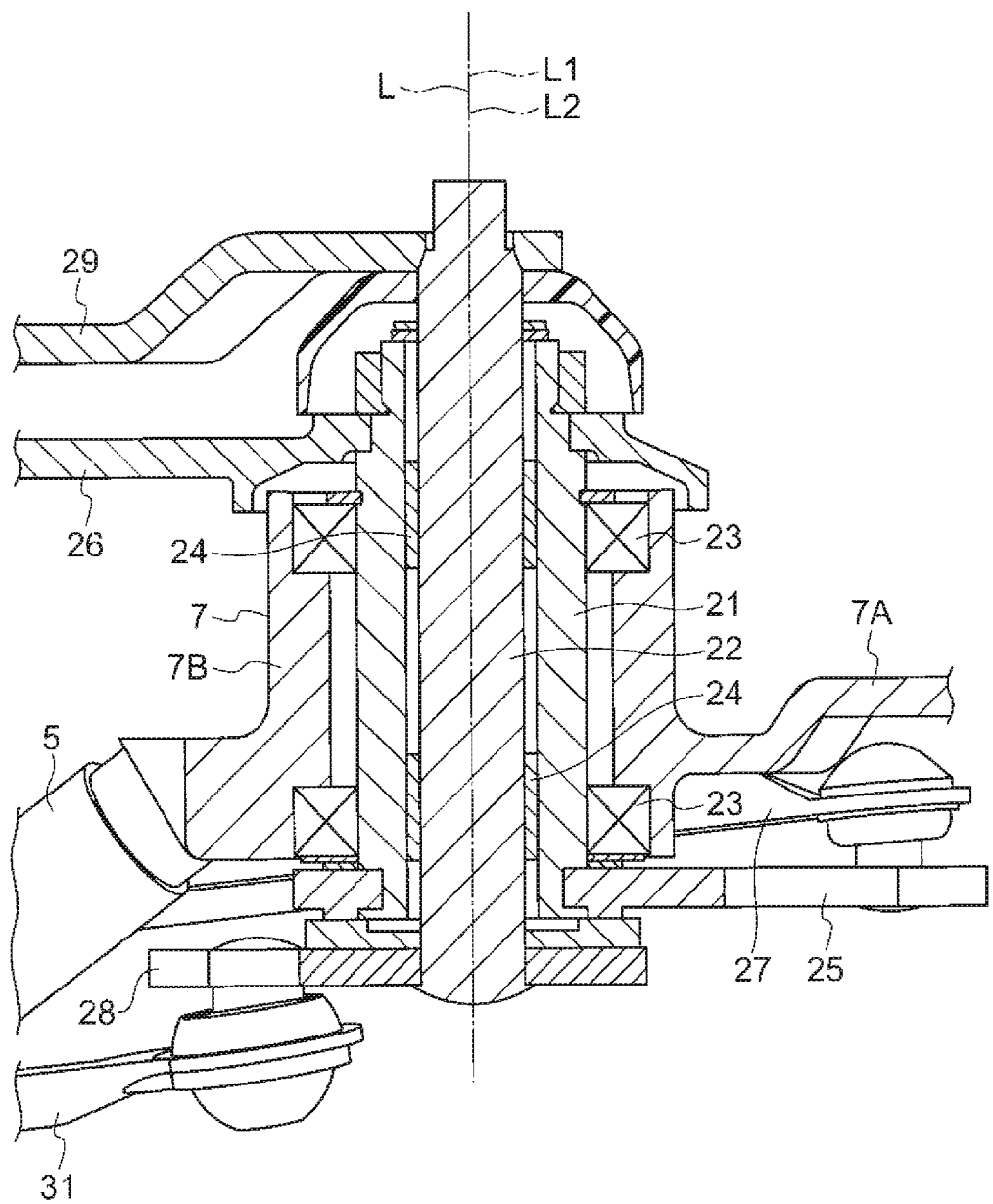
FIG. 3 is a cross-section of a second holder member, taken along line A-A in FIG. 2.

FIG. 3 is a cross-section illustrating the second holder member 7 as sectioned along line A-A in FIG. 2. As illustrated in FIG. 3, the second holder member 7 supports a first front passenger seat side pivot shaft 21 so as to be capable of rotating about a first axis L1, and supports a second front passenger seat side pivot shaft 22 so as to be capable of rotating about a second axis L2. In the present exemplary embodiment, the first axis L1 and the second axis L2 are disposed on (centered on) the same straight line L. Note that FIG. 3 illustrates a state in which a waterproof cover K illustrated in FIG. 2 and FIG. 4 to FIG. 8 has been removed.

The second holder member 7 is formed with a tubular portion 7B, and the first front passenger seat side pivot shaft 21 is rotatably supported through a shaft bearing 23 at the peripheral inside of the tubular portion 7B. The first front passenger seat side pivot shaft 21 is formed in a tube shape, and the second front passenger seat side pivot shaft 22 is rotatably supported through a shaft bearing 24 at the peripheral inside of the first front passenger seat side pivot shaft 21.

One end of a first front passenger seat side swing lever 25 is fixed to a base end portion of the first front passenger seat side pivot shaft 21, and one end of a first drive lever 26 is fixed to a leading end portion of the first front passenger seat side pivot shaft 21. As illustrated in FIG. 2, the other end of the first front passenger seat side swing lever 25 and the other end of the driver's seat side swing lever 16 are coupled together by a second coupling rod 27. Accordingly, when the first motor 11 is driven and the driver's seat side swing lever 16 swings, the second coupling rod 27 transmits drive force to the first front passenger seat side swing lever 25, and the first drive lever 26 swings (rotates) about the first axis L1 together with the first front passenger seat side swing lever 25.

As illustrated in FIG. 3, the second front passenger seat side pivot shaft 22 is formed longer than the first front passenger seat side pivot shaft 21, and a base end portion and a leading end portion of the second front passenger seat side pivot shaft 22 project in an axial direction from the first front passenger seat side pivot shaft 21. One end of a second front passenger seat side swing lever 28 is fixed to a base end portion of the second front passenger seat side pivot shaft, and one end of a second drive lever 29 is fixed to a leading end portion of the second front passenger seat side pivot shaft 22.

The other end of the second drive crank arm 14 and the other end of the second front passenger seat side swing lever 28 are coupled together by a third coupling rod 31. Accordingly, when the second motor 12 is driven, the second drive crank arm 14 rotates, and the third coupling rod 31 transmits drive force of the second drive crank arm 14 to the second front passenger seat side swing lever 28, such that the second drive lever 29 swings (rotates) together with the second front passenger seat side swing lever 28. As described above, the first front passenger seat side pivot shaft 21 and the second front passenger seat side pivot shaft 22 are provided coaxially to one another. However, movement of the first front passenger seat side pivot shaft 21 and the second front passenger seat side pivot shaft 22 is not coupled, and therefore the first front passenger seat side pivot shaft 21 and the second front passenger seat side pivot shaft 22 rotate independently of each other.

As illustrated in FIG. 2 and FIG. 4 to FIG. 8, the wiper device 2 includes a first following lever 32. A base end portion of the first following lever 32 is coupled so as to be capable of rotating about a third axis L3 at the other end side of the first drive lever 26.

The wiper device 2 also includes an arm head 33 configuring a second following lever. A base end portion of the arm head 33 is coupled so as to be capable of rotating about a fourth axis L4 at a leading end side of the first following lever 32. A leading end side of the arm head 33 is coupled so as to be capable of rotating about a fifth axis L5 at the other end side of the second drive lever 29. The arm head 33 configures the front passenger seat side wiper arm 35 together with a retainer 34. A base end portion of the retainer 34 is fixed to the leading end of the arm head 33. The front passenger seat side wiper blade 36 that wipes the front passenger seat side of the windshield glass 1 is coupled to a leading end portion of the front passenger seat side wiper arm 35.

The first drive lever 26, the second drive lever 29, the first following lever 32, and the arm head 33 are coupled such that a length from the first axis L1 (second axis L2) to the third axis L3 is the same as the length from the fourth axis L4 to the fifth axis L5. The first drive lever 26, the second drive lever 29, the first following lever 32, and the arm head 33 are also coupled such that the length from the third axis L3 to the fourth axis L4 is the same as the length from the first axis L1 (second axis L2) to the fifth axis L5. Accordingly, the first drive lever 26 and the arm head 33 are retained parallel to each other, and the second drive lever 29 and the first following lever 32 are retained parallel to each other. The first drive lever 26, the second drive lever 29, the first following lever 32, and the arm head 33 configure a link mechanism that has a substantially parallelogram shape.

Figure 4:
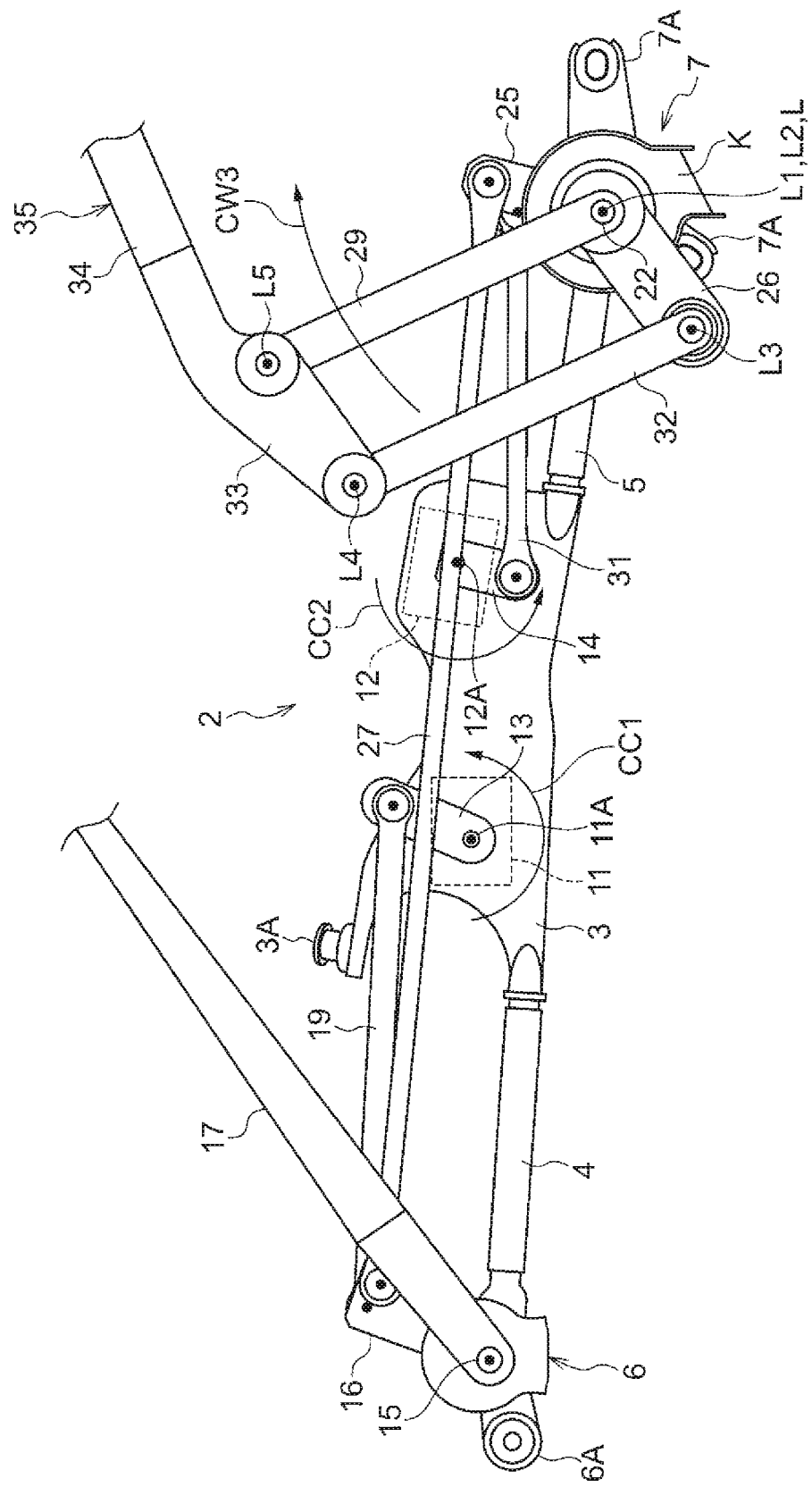
FIG. 4 is a plan view illustrating progression of an operation of a vehicle wiper device according to an exemplary embodiment of technology disclosed herein.
Figure 5:
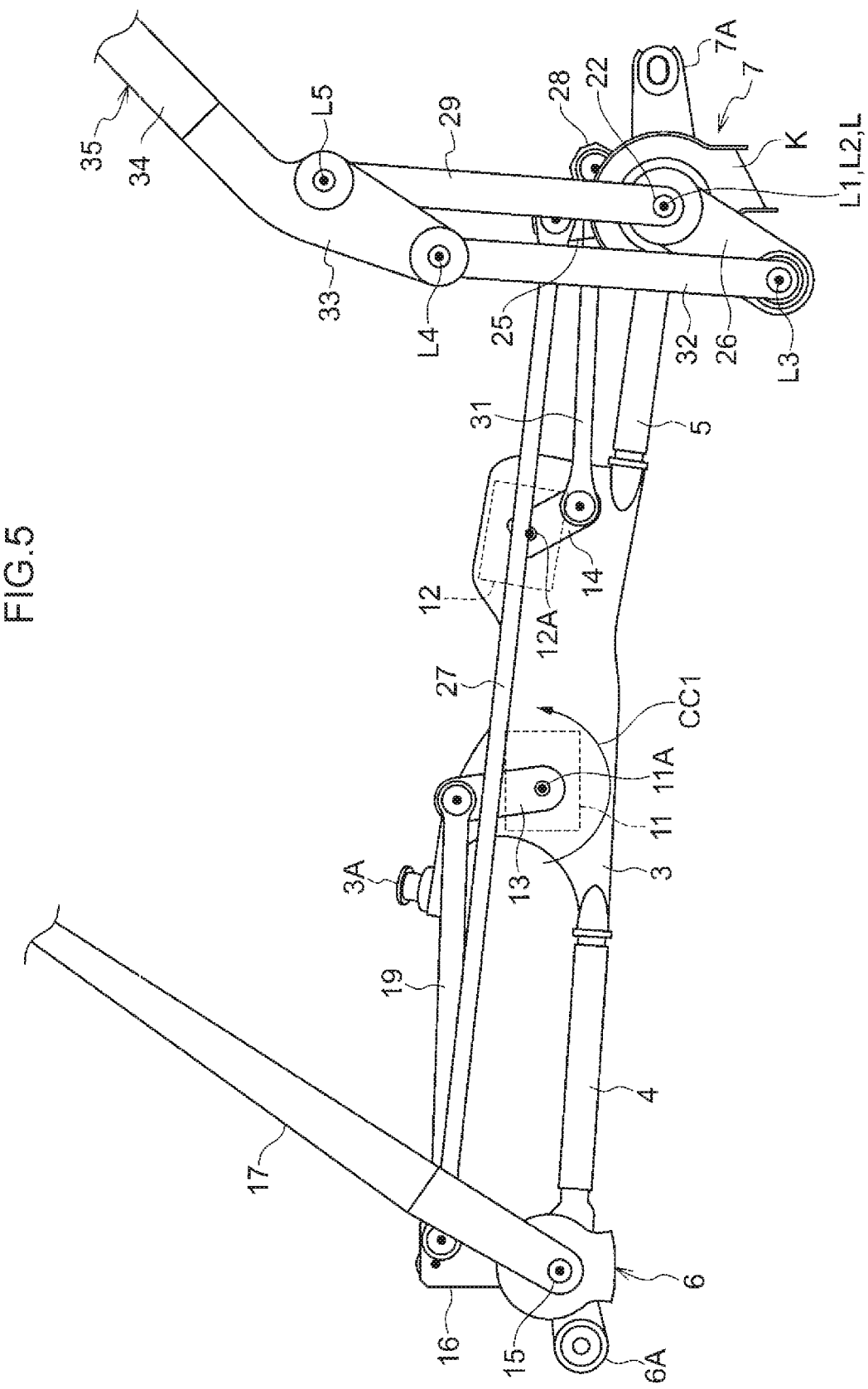
FIG. 5 is a plan view illustrating progression of an operation of a vehicle wiper device according to an exemplary embodiment of technology disclosed herein.
Figure 6:
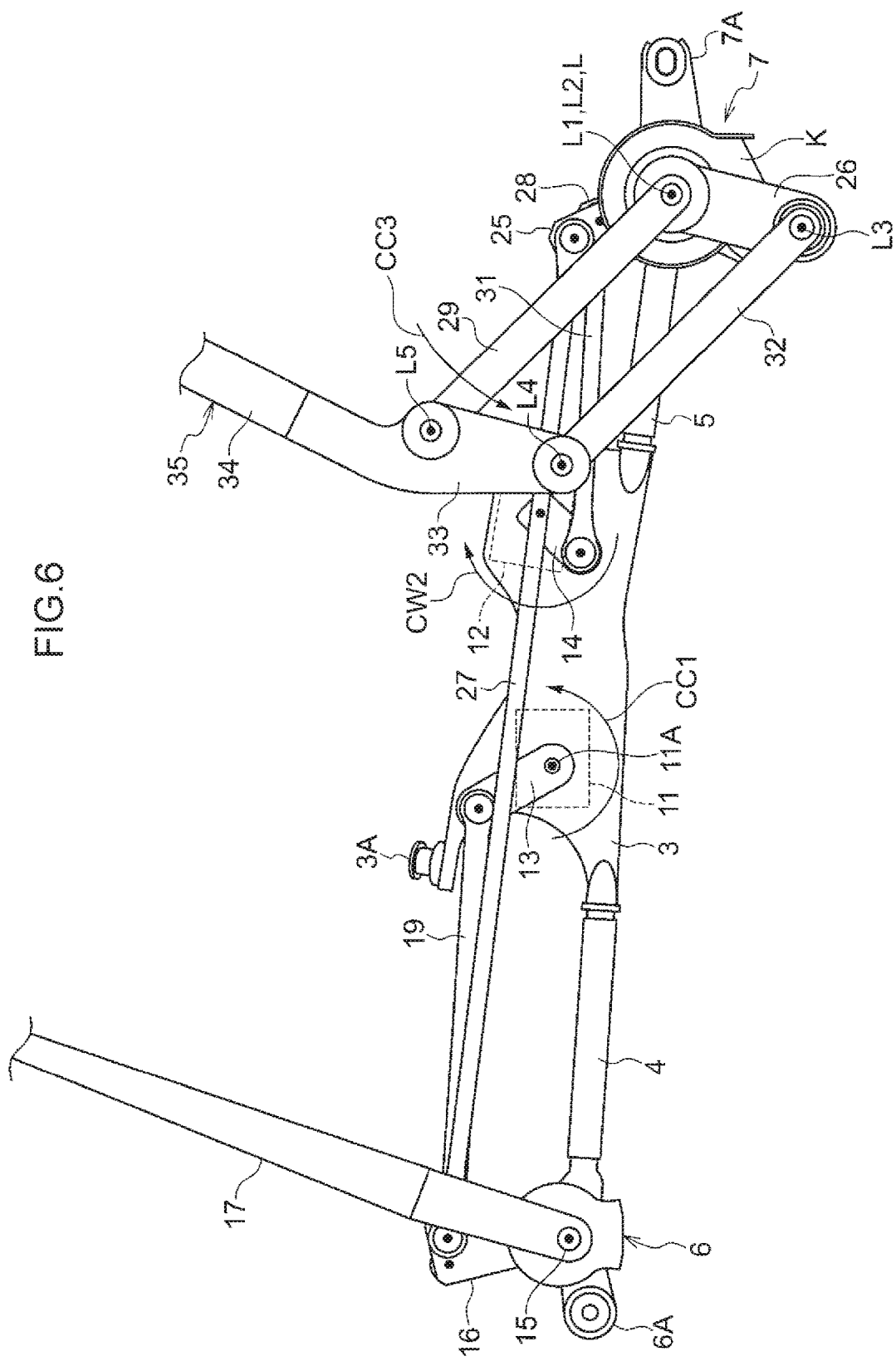
FIG. 6 is a plan view illustrating progression of an operation of a vehicle wiper device according to an exemplary embodiment of technology disclosed herein.

The fifth axis L5 is a pivot point for the movement of the front passenger seat side wiper arm 35. The front passenger seat side wiper arm 35 moves back and forth over the windshield glass 1, rotated about the fifth axis L5 by drive force from the first motor 11. As illustrated in FIG. 4 to FIG. 6, via the substantially parallelogram shaped link mechanism configured by the first drive lever 26, the second drive lever 29, the first following lever 32, and the arm head 33, the second motor 12 moves the fifth axis L5 to a higher position on the windshield glass 1 than the position illustrated in FIG. 2, FIG. 7, and FIG. 8. The front passenger seat side wiper arm 35 appears to extend due to this movement of the fifth axis L5. When both the first motor 11 and the second motor 12 are in operation, the front passenger seat side wiper blade 36 wipes the wiping range Z2.

Figure 7:
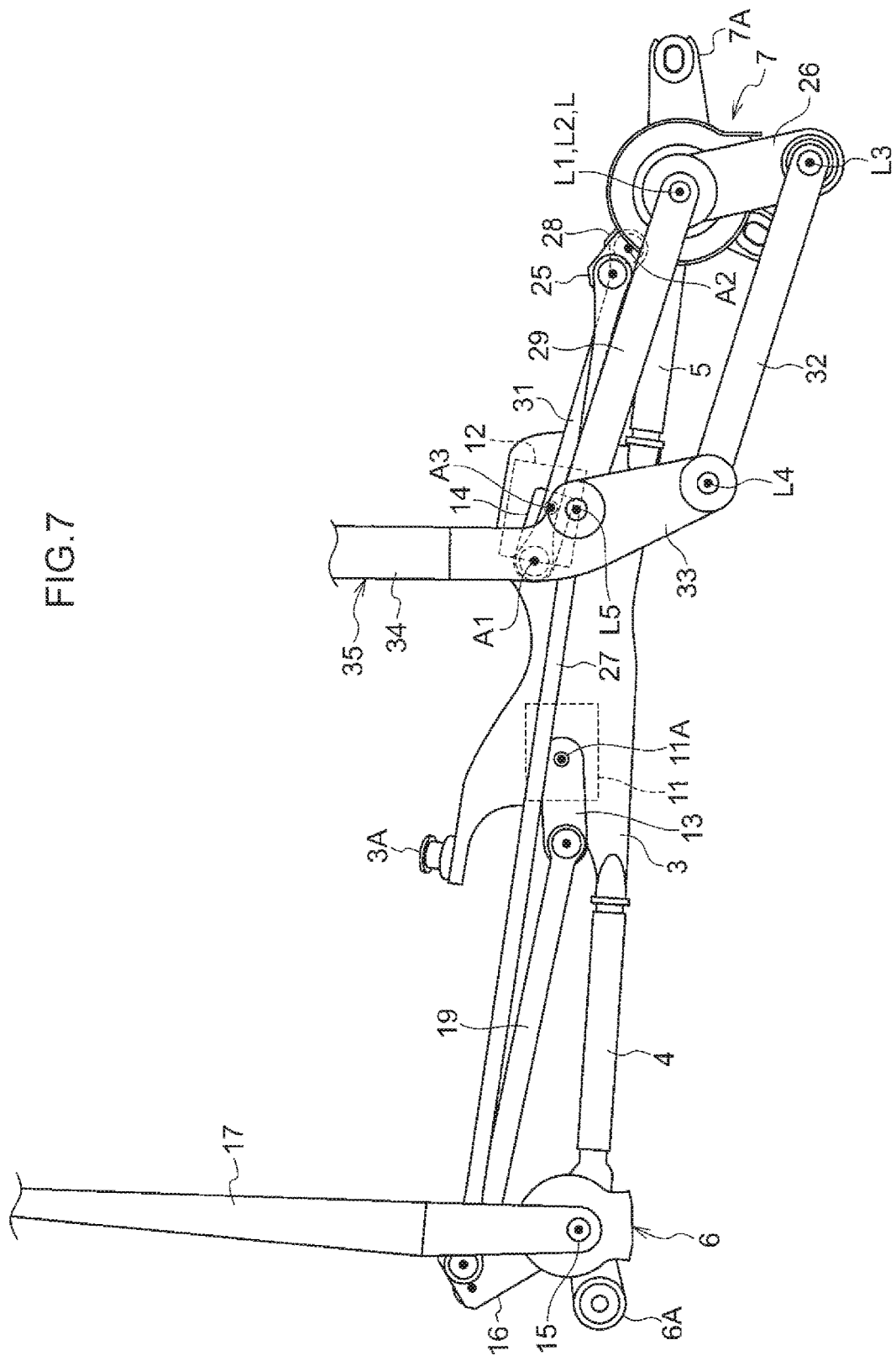
FIG. 7 is a plan view illustrating progression of an operation of a vehicle wiper device according to an exemplary embodiment of technology disclosed herein.
Figure 8:
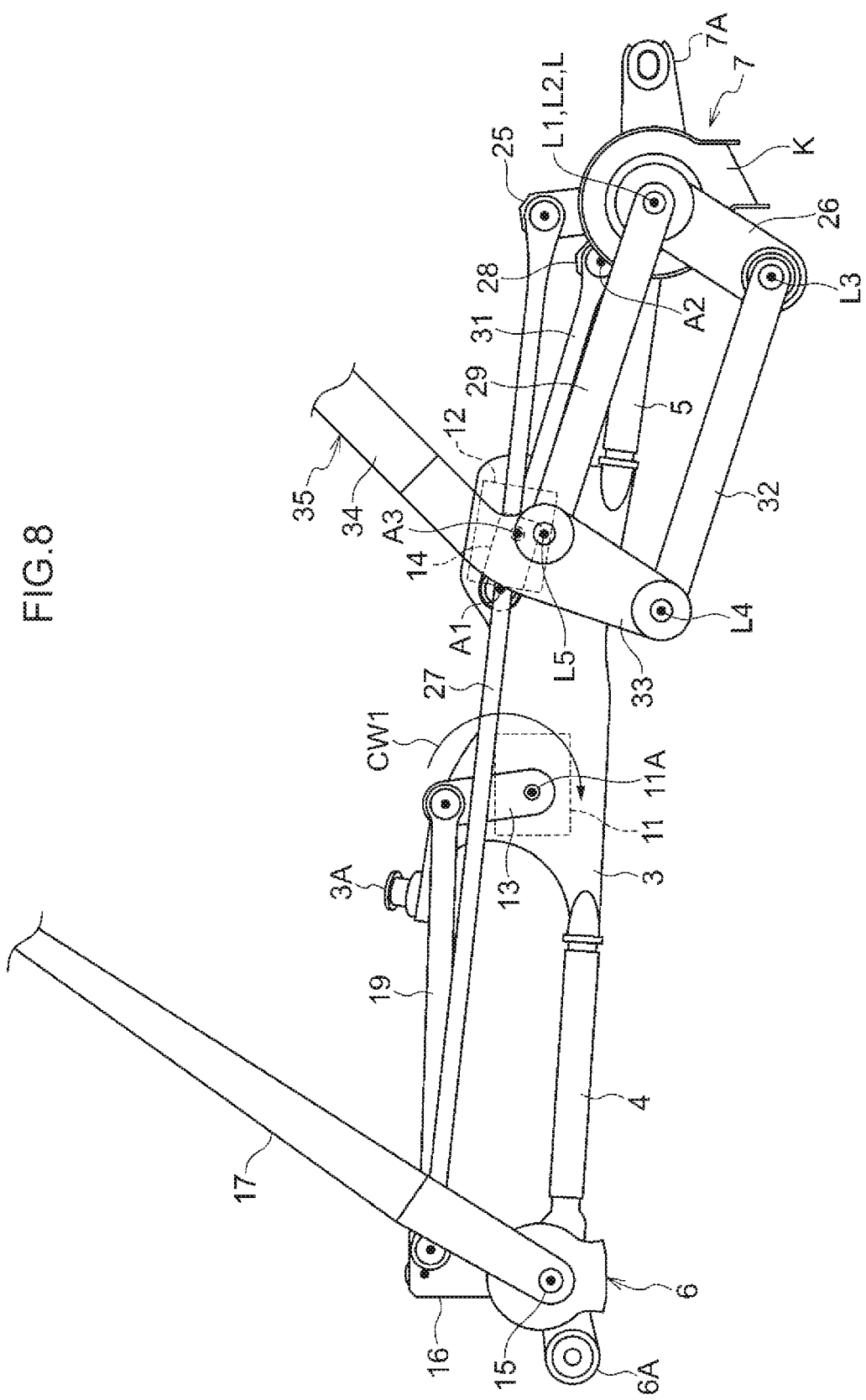
FIG. 8 is a plan view illustrating progression of an operation of a vehicle wiper device according to an exemplary embodiment of technology disclosed herein.

When the second motor 12 is not operated and the first motor 11 operates on its own, the fifth axis L5 does not move from the position illustrated in FIG. 2, FIG. 7, and FIG. 8 (referred to hereafter as a "first position"). Accordingly, the front passenger seat side wiper arm 35 moves between the lower return position P2P and the upper return position P1P so as to describe a substantially circular arc shaped trajectory centered on the stationary fifth axis L5 that has a position that does not change, and the front passenger seat side wiper blade 36 wipes the substantially fan-shaped wiping range Z1.

In the present exemplary embodiment, when it is necessary to wipe the windshield glass 1 over a broad area, as the front passenger seat side wiper blade 36 moves on an outward path from the lower return position P2P toward the upper return position P1P, the first motor 11 and the second motor 12 are both controlled in order to wipe the wiping range Z2. When the front passenger seat side wiper blade 36 changes direction at the upper return position P1P and moves on a return path toward the lower return position P2P, the first motor 11 and the second motor 12 are both controlled in order to wipe the wiping range Z1. As the front passenger seat side wiper blade 36 moves back and forth between the lower return position P2P and the upper return position P1P, the wiping range Z2 is wiped on the outward path and the wiping range Z1 is wiped on the return path. Wiping both wiping ranges enables the windshield glass 1 to be wiped over a broad range. Alternatively, wiping the wiping range Z1 on the outward path and wiping the wiping range Z2 on the return path as the front passenger seat side wiper blade 36 moves back and forth between the lower return position P2P and the upper return position P1P also enables the windshield glass 1 to be wiped over a broad range. Alternatively, configuration may be made so as to wipe the wiping range Z2 on both the outward path and the return path.

Explanation follows regarding operation of the wiper device 2 according to the present exemplary embodiment. In the present exemplary embodiment, the driver's seat side wiper arm 17 and the driver's seat side wiper blade 18 only move about the driver's seat side pivot shaft 15 accompanying rotation of the first motor 11. Accordingly, in the following explanation, detailed explanation is given regarding operation of the front passenger seat side wiper arm 35 and the front passenger seat side wiper blade 36. The following explanation of the operation of the wiper device 2 describes a case in which the wiping area is enlarged on the outward path.

FIG. 2 illustrates a state in which the front passenger seat side wiper blade 36 is positioned at the lower return position P2P, and a state in which the front passenger seat side wiper arm 35 is at an inactive position. In this state, when the washer switch 62 or the enlargement mode switch previously described is switched ON, under the control of the control circuit 52 the first output shaft 11A of the first motor 11 rotates in a rotation direction CC1, illustrated in FIG. 4, thereby starting rotation of the first drive lever 26 and starting rotational movement of the front passenger seat side wiper arm 35 about the fifth axis L5. At the same time, the second output shaft 12A of the second motor 12 starts rotating in a rotation direction CC2, illustrated in FIG. 4. Note that in the present exemplary embodiment, the rotation direction CC1 rotation of the first output shaft 11A and the rotation direction CC2 rotation of the second output shaft 12A correspond to forward rotation of the respective output shafts.

FIG. 4 illustrates a state in which the front passenger seat side wiper blade 36 has wiped partway (approximately one quarter of the outward journey) across the windshield glass 1. In the present exemplary embodiment, when the first motor 11 starts to rotate in the rotation direction CC1, drive force from the rotation direction CC2 rotation of the second motor 12 is transmitted to the second drive lever 29. The drive force of the second motor 12 transmitted to the second drive lever 29 moves the second drive lever 29 in a movement direction CW3, such that the second drive lever 29 moves the fifth axis L5 configuring the pivot point of the front passenger seat side wiper arm 35 upward and toward the front passenger seat side of the windshield glass 1.

FIG. 5 illustrates a case in which the first output shaft 11A has rotated as far as an intermediate rotation angle between 0° and the first predetermined angle, such that the first drive lever 26 has rotated further and the front passenger seat side wiper blade 36 has reached substantially midway on its journey (outward journey) between the lower return position P2P and the upper return position P1P. FIG. 5 also illustrates a state in which the second output shaft 12A of the second motor 12 has rotated as far as the second predetermined rotation angle in the rotation direction CC2 illustrated in FIG. 4. Since the second output shaft 12A has reached its maximum forward rotation angle, the fifth axis L5 configuring the pivot point of the front passenger seat side wiper arm 35 is raised to its highest position (second position) by the second drive crank arm 14, the third coupling rod 31, the second front passenger seat side swing lever 28, and the second drive lever 29. As a result, as illustrated in FIG. 1, a leading end portion of the front passenger seat side wiper blade 36 is moved as far as a position close to an upper corner on the front passenger seat side of the windshield glass 1. Note that the intermediate rotation angle mentioned above is approximately half of the first predetermined rotation angle, but is set on a case-by-case basis according to such factors as the shape of the windshield glass 1. Note that the second position corresponds to the highest position at which the fifth axis L5 is disposed for each enlargement ratio. To explain in more detail, the second position is the position where the fifth axis L5 is disposed when the first output shaft 11A has rotated as far as the intermediate rotation angle between 0° and the first predetermined rotation angle as the front passenger seat side wiper blade wipes a wiping range that is broader than the wiping range Z1 (for example, the wiping range Z2).

FIG. 6 illustrates a case in which the first drive lever 26 has rotated further, such that the front passenger seat side wiper blade 36 has covered approximately three-quarters of the journey (outward journey) between the lower return position P2P and the upper return position P1P. In FIG. 6, the rotation direction of the first output shaft 11A of the first motor 11 is the same as that illustrated in FIG. 4 and FIG. 5. However, the second output shaft 12A of the second motor 12 is rotating in a rotation direction CW2 (backward rotation), this being the opposite rotation direction to that illustrated in FIG. 4 and FIG. 5. Since the second output shaft 12A is rotating in the rotation direction CW2, the second drive lever 29 moves in a movement direction CC3, and the fifth axis L5 configuring the pivot point of the front passenger seat side wiper arm 35 moves downward from the second position. As a result, the leading end portion of the front passenger seat side wiper blade 36 moves across the windshield glass 1 so as to describe the trajectory illustrated by dashed lines at the top of the wiping range Z2 in FIG. 1, thereby wiping the wiping range Z2.

FIG. 7 illustrates a case in which the first output shaft 11A of the first motor 11 has rotated forward as far as the first predetermined rotation angle, and the second output shaft 12A of the second motor 12 has rotated backward by the second predetermined rotation angle. The first output shaft 11A of the first motor 11 has reached its maximum forward rotation angle, and therefore the driver's seat side wiper arm 17 and the driver's seat side wiper blade 18 reach the upper return position P1D. The second output shaft 12A of the second motor 12 has rotated backward by the second predetermined rotation angle from the state illustrated in FIG. 5 (a state in which the second output shaft 12A has rotated forward and reached the second predetermined rotation angle), such that the fifth axis L5 configuring the pivot point of the front passenger seat side wiper arm 35 has returned to the first position illustrated in FIG. 2, this being its position prior to the second output shaft 12A of the second motor 12 starting to rotate forward. As a result, the front passenger seat side wiper arm 35 and the front passenger seat side wiper blade 36 reach the same upper return position P1P as that of the wiping range Z1 when the second motor 12 is not driven.

FIG. 8 illustrates a state during movement of the driver's seat side wiper arm 17 and the driver's seat side wiper blade 18, as well as the front passenger seat side wiper arm 35 and the front passenger seat side wiper blade 36, from the upper return positions P1D, P1P toward the lower return positions P2D, P2P (a return journey). On the return path, the first output shaft 11A of the first motor 11 rotates backward so as to rotate in a rotation direction CW1, this being the opposite direction to that illustrated in FIG. 2 and in FIG. 4 to FIG. 7. However, the second output shaft 12A of the second motor 12 does not rotate, and therefore the fifth axis L5 configuring the pivot point of the front passenger seat side wiper arm 35 does not move from the first position, such that the front passenger seat side wiper arm 35 describes a substantially circular arc shaped trajectory as a result of the backward rotation of the first output shaft 11A of the first motor 11. As a result, the front passenger seat side wiper blade 36 that is coupled to the leading end of the front passenger seat side wiper arm 35 wipes the wiping range Z1.

Explanation has been given regarding operation of the wiper device 2 when the wiping area is enlarged on the outward path. In cases in which enlarged wiping is performed on the return path, illustrated in FIG. 8, the first output shaft 11A of the first motor 11 is rotated in the rotation direction CW1, and the second output shaft 12A of the second motor 12 starts to rotate in the rotation direction CC2 illustrated in FIG. 4, such that the front passenger seat side wiper arm 35 begins to extend. Then, as illustrated in FIG. 5, the second output shaft 12A rotates as far as the second predetermined rotation angle when the first output shaft 11A has rotated to the intermediate rotation angle between 0° and the first predetermined rotation angle, such that the front passenger seat side wiper arm 35 reaches its maximum extension. Subsequently, the second output shaft 12A is rotated in the rotation direction CW2 illustrated in FIG. 6, thereby retracting the extended front passenger seat side wiper arm 35.

Figure 9:
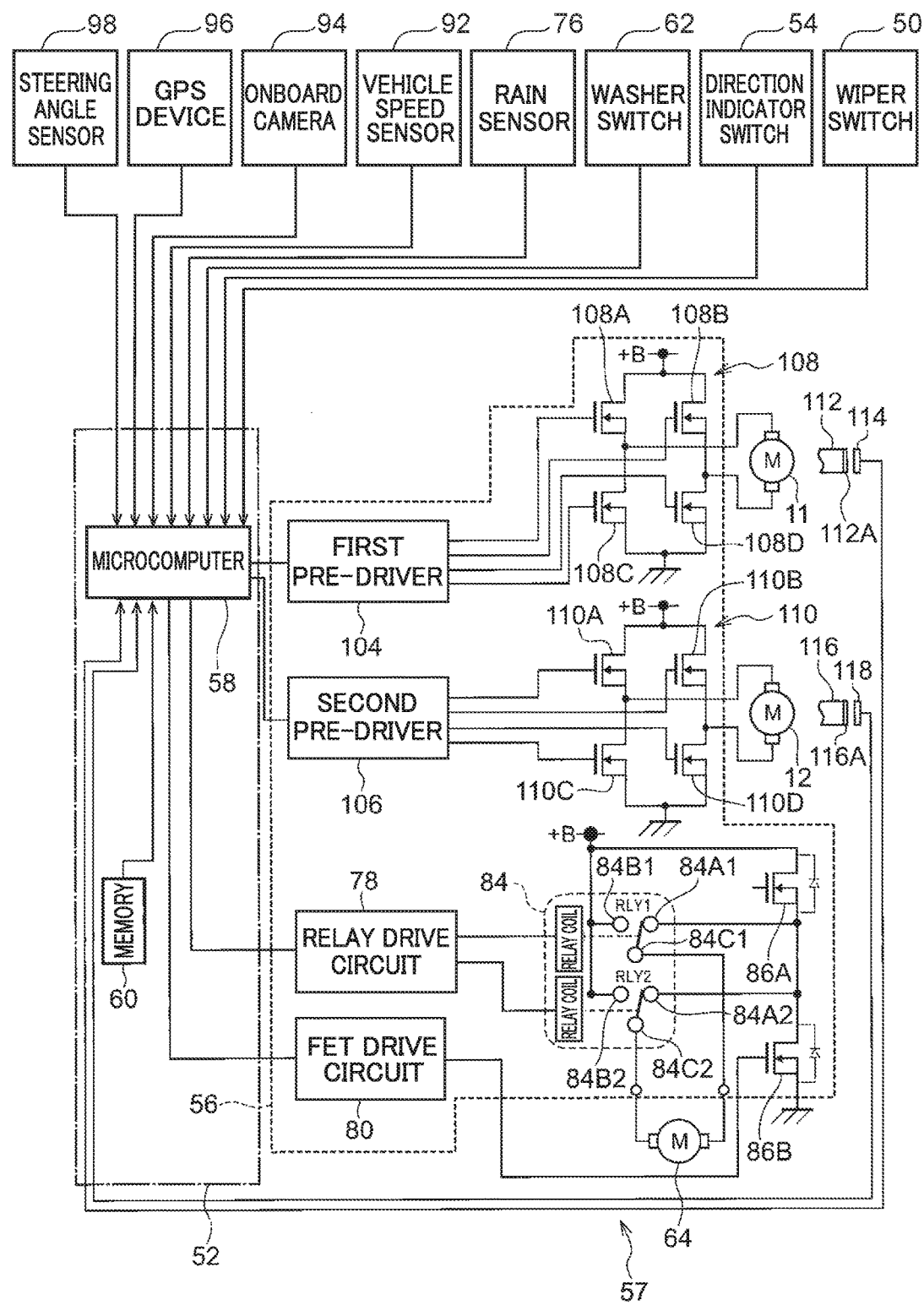
FIG. 9 is a schematic circuit diagram illustrating circuitry of a wiper system according to an exemplary embodiment of technology disclosed herein.

FIG. 9 is a schematic circuit diagram illustrating circuitry of the wiper system 100 according to the present exemplary embodiment. As illustrated in FIG. 9, the wiper system 100 includes the control circuit 52 and the drive circuit 56.

The control circuit 52 includes the microcomputer 58 and the memory 60 as described above. Connected to the microcomputer 58 via the vehicle ECU 90 (not illustrated in FIG. 9) are the wiper switch 50, the direction indicator switch 54, the washer switch 62, the rain sensor 76, the vehicle speed sensor 92, the onboard camera 94, the GPS device 96, and the steering angle sensor 98.

The drive circuit 56 includes a first pre-driver 104 and a first motor drive circuit 108 to drive the first motor 11, and a second pre-driver 106 and a second motor drive circuit 110 to drive the second motor 12. The drive circuit 56 also includes a relay drive circuit 78, a FET drive circuit 80, and a washer motor drive circuit 57 to drive the washer motor 64.

The microcomputer 58 of the control circuit 52 controls rotation of the first motor 11 by using the first pre-driver 104 to switch ON and OFF switching elements configuring the first motor drive circuit 108, and also controls rotation of the second motor 12 by using the second pre-driver 106 to switch ON and OFF switching elements configuring the second motor drive circuit 110. The microcomputer 58 also controls rotation of the washer motor 64 by controlling the relay drive circuit 78 and the FET drive circuit 80.

In cases in which the first motor 11 and the second motor 12 are configured by brushed DC motors, the first motor drive circuit 108 and the second motor drive circuit 110 include four switching elements each. The switching elements are, for example, N-type field-effect transistors (FET).

As illustrated in FIG. 9, the first motor drive circuit 108 includes FETs 108A to 108D. The drain of the FET 108A is connected to a power source (+B), the gate of the FET 108A is connected to the first pre-driver 104, and the source of the FET 108A is connected to one end portion of the first motor 11. The drain of the FET 108B is connected to the power source (+B), the gate of the FET 108B is connected to the first pre-driver 104, and the source of the FET 108B is connected to the other end portion of the first motor 11. The drain of the FET 108C is connected to the one end portion of the first motor 11, the gate of the FET 108C is connected to the first pre-driver 104, and the source of the FET 108C is connected to earth. The drain of the FET 108D is connected to the other end portion of the first motor 11, the gate of the FET 108D is connected to the first pre-driver 104, and the source of the FET 108D is connected to earth.

The first pre-driver 104 controls drive of the first motor 11 by switching control signals supplied to the gates of the respective FETs 108A to 108D according to control signals from the microcomputer 58. Namely, when the first pre-driver 104 rotates the first output shaft 11A of the first motor 11 in a predetermined direction (forward rotation), the first pre-driver 104 switches ON the FET 108A and the FET 108D as a pair, and when the first pre-driver 104 rotates the first output shaft 11A of the first motor 11 in the opposite direction to the predetermined direction (backward rotation), the first pre-driver 104 switches ON the FET 108B and the FET 108C as a pair. The first pre-driver 104 also performs PWM by switching the FET 108A and the FET 108D ON and OFF intermittently based on control signals from the microcomputer 58.

The first pre-driver 104 adjusts the ON/OFF duty ratio of the FET 108A and the FET 108D by PWM so as to control the rotation speed of the forward rotation of the first motor 11. The greater the duty ratio, the higher the effective voltage applied to the terminal of the first motor 11 during forward rotation, thus increasing the rotation speed of the first motor 11.

Similarly, the first pre-driver 104 adjusts the ON/OFF duty ratio of the FET 108B and the FET 108C by PWM so as to control the rotation speed of the backward rotation of the first motor 11. The greater the duty ratio, the higher the effective voltage applied to the terminal of the first motor 11 during backward rotation, thus increasing the rotation speed of the first motor 11.

The second motor drive circuit 110 includes FETs 110A to 110D. The drain of the FET 110A is connected to the power source (+B), the gate of the FET 110A is connected to the second pre-driver 106, and the source of the FET 110A is connected to one end portion of the second motor 12. The drain of the FET 110B is connected to the power source (+B), the gate of the FET 110B is connected to the second pre-driver 106, and the source of the FET 110B is connected to another end portion of the second motor 12. The drain of the FET 110C is connected to the one end portion of the second motor 12, the gate of the FET 110C is connected to the second pre-driver 106, and the source of the FET 110C is connected to earth. The drain of the FET 110D is connected to the other end portion of the second motor 12, the gate of the FET 110D is connected to the second pre-driver 106, and the source of the FET 110D is connected to earth.

The second pre-driver 106 controls drive of the second motor 12 by switching control signals supplied to the gates of the respective FETs 110A to 110D according to control signals from the microcomputer 58. Namely, when the second pre-driver 106 rotates the second output shaft 12A of the second motor 12 in a predetermined direction (forward rotation), the second pre-driver 106 switches ON the FET 110A and the FET 110D as a pair, and when the second pre-driver 106 rotates the second output shaft 12A of the second motor 12 in the opposite direction to the predetermined direction (backward rotation), the second pre-driver 106 switches ON the FET 110B and the FET 110C as a pair. Similarly to the first pre-driver 104 described above, the second pre-driver 104 also controls the rotation speed of the second motor 12 by performing PWM based on control signals from the microcomputer 58.

A bipolar sensor magnet 112A is fixed to an output shaft end portion 112 of the first output shaft 11A within the speed reduction mechanism of the first motor 11. A first absolute angle sensor 114 is provided opposing the sensor magnet 112A.

A bipolar sensor magnet 116A is fixed to an output shaft end portion 116 of the second output shaft 12A inside the speed reduction mechanism of the second motor 12. A second absolute angle sensor 118 is provided opposing the sensor magnet 116A.

The first absolute angle sensor 114 detects the magnetic field of the sensor magnet 112A, and the second absolute angle sensor 118 detects the magnetic field of the sensor magnet 116A. The first absolute angle sensor 114 and the second absolute angle sensor 118 output signals corresponding to the strength of the detected magnetic fields. The microcomputer 58 computes the rotation angles, rotation positions, rotation directions, and rotation speeds of the first output shaft 11A of the first motor 11 and of the second motor 12 based on the respective signals output from the first absolute angle sensor 114 and the second absolute angle sensor 118.

Note that the first absolute angle sensor 114 is an example of a "rotation angle detector" of technology disclosed herein.

The position of the driver's seat side wiper blade 18 between the lower return position P2D and the upper return position P1D can be computed from the rotation angle of the first output shaft 11A of the first motor 11. Moreover, the amount of apparent extension (referred to hereafter simply as "extension") of the front passenger seat side wiper arm 35 (an amount of enlargement) can be computed from the rotation angle of the second output shaft 12A of the second motor 12. The microcomputer 58 controls the rotation angle of the second output shaft 12A based on the position of the driver's seat side wiper blade 18 between the lower return position P2D and the upper return position P1D as computed from the rotation angle of the first output shaft 11A, in order to align the action of the first motor 11 and the action of the second motor 12. For example, the memory 60 is pre-stored with a map (for example, a second output shaft rotation angle map, described below) in which positions of the driver's seat side wiper blade 18 between the lower return position P2D and the upper return position P1D (or rotation angles of the first output shaft 11A) are associated with rotation angles of the second output shaft 12A. The rotation angle of the second output shaft 12A is controlled in accordance with the rotation angle of the first output shaft 11A according to this map.

Figure 10:
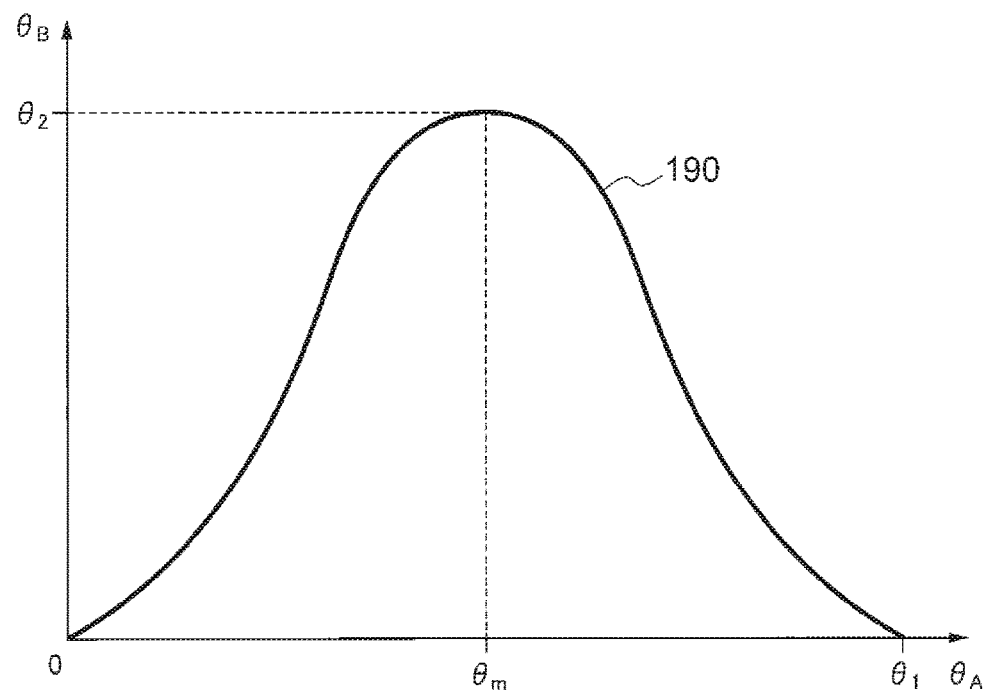
FIG. 10 illustrates an example of a second output shaft rotation angle map that defines rotation angles for a second output shaft according to rotation angles of a first output shaft in an exemplary embodiment of technology disclosed herein.

FIG. 10 illustrates an example of the second output shaft rotation angle map according to the present exemplary embodiment, in which rotation angles of the second output shaft 12A are defined in accordance with rotation angles of the first output shaft 11A. In FIG. 10, the horizontal axis represents rotation angles of the first output shaft 11A as first output shaft rotation angles $\theta_A$, and the vertical axis represents rotation angles of the second output shaft 12A as second output shaft rotation angles $\theta_B$. The origin O in FIG. 10 represents a state in which the front passenger seat side wiper blade 36 is located at the lower return position P2P. The $\theta_1$ in FIG. 10 represents a state in which the first output shaft 11A has rotated by a first predetermined rotation angle $\theta_1$ such that the front passenger seat side wiper blade 36 is located at the upper return position P1P.

When the first absolute angle sensor 114 that rotation of the first output shaft 11A of the first motor 11 has started, the microcomputer 58 cross references the rotation angle of the first output shaft 11A as detected by the first absolute angle sensor 114 against the second output shaft rotation angle map. By this cross referencing, the second output shaft rotation angle $\theta_B$ corresponding to the first output shaft rotation angle $\theta_A$ detected by the first absolute angle sensor 114 is computed based on the angle indicated by the curve 190 in FIG. 10, and the rotation angle of the second output shaft 12A of the second motor 12 is controlled so as to become the computed second output shaft rotation angle $\theta_B$.

More specifically, when the rotation angle of the first output shaft 11A of the first motor 11 detected by the first absolute angle sensor 114 starts to change in the forward rotation direction from 0°, the microcomputer 58 determines that the front passenger seat side wiper blade 36 has started to move from the lower return position P2P, and starts forward rotation of the second output shaft 12A. As described above, the microcomputer 58 uses the second output shaft rotation angle map to determine the rotation angle of the second output shaft 12A in accordance with the rotation angle of the first output shaft 11A, and the microcomputer 58 monitors the rotation angle of the second output shaft 12A based on signals from the second absolute angle sensor 118 and controls the rotation of the second motor 12 to be the rotation angle determined using the second output shaft rotation angle map. Although this depends on the settings of the second output shaft rotation angle map, as illustrated in FIG. 10, when the first output shaft rotation angle $θ_A$ is an intermediate rotation angle $θ_m$ between 0° and the first predetermined rotation angle $θ_1$, the forward rotation angle of the second output shaft 12A is made to become the second predetermined rotation angle $θ_2$. Bringing the forward rotation angle of the second output shaft 12A to the second predetermined rotation angle $θ_2$ moves the fifth axis L5 configuring the pivot point of the front passenger seat side wiper arm 35 upward (to the second position) on the front passenger seat side of the windshield glass 1.

After the forward rotation angle of the second output shaft 12A has reached the second predetermined rotation angle $θ_2$, the rotation angle of the second output shaft 12A is reduced according to the second output shaft rotation angle map. Specifically, the second output shaft 12A is rotated backward by the second predetermined rotation angle θ2 until the rotation angle of the first output shaft 11A of the first motor 11 reaches the first predetermined rotation angle $θ_1$, and the front passenger seat side wiper blade 36 reaches the upper return position P1P, thereby reducing the rotation angle of the second output shaft 12A to 0°. This backward rotation of the second output shaft 12A returns the fifth axis L5 configuring the pivot point of the front passenger seat side wiper arm 35 to its original position (the first position).

A case in which the wiping range Z2 is wiped as the front passenger seat side wiper blade 36 is moved from the lower return position P2P toward the upper return position P1P has been described above. In cases in which the wiping range Z2 is wiped as the front passenger seat side wiper blade 36 is moved from the upper return position P1P to the lower return position P2P, when the rotation angle of the first output shaft 11A detected by the first absolute angle sensor 114 starts to change in the backward rotation direction from 0°, the front passenger seat side wiper blade 36 is determined to have started moving away from the upper return position P1P, and forward rotation of the second output shaft 12A of the second motor 12 is started. Note that although the curve 190 has left-right symmetry about the intermediate rotation angle $θ_m$ in the second output shaft rotation angle map illustrated in FIG. 10, there is no limitation thereto. The curve of the map is set on a case-by-case basis according to such factors as the shape of the windshield glass 1.

Figure 16:
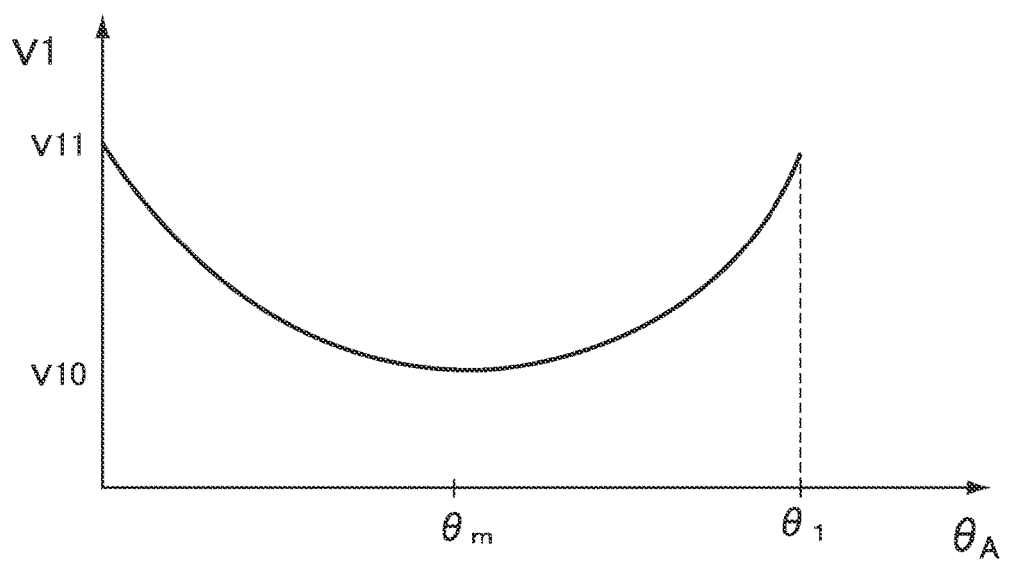
FIG. 16 is a diagram illustrating a map in which rotation speeds V1 of a first output shaft 11A are defined in accordance with rotation angles of the first output shaft 11A.
Figure 17:
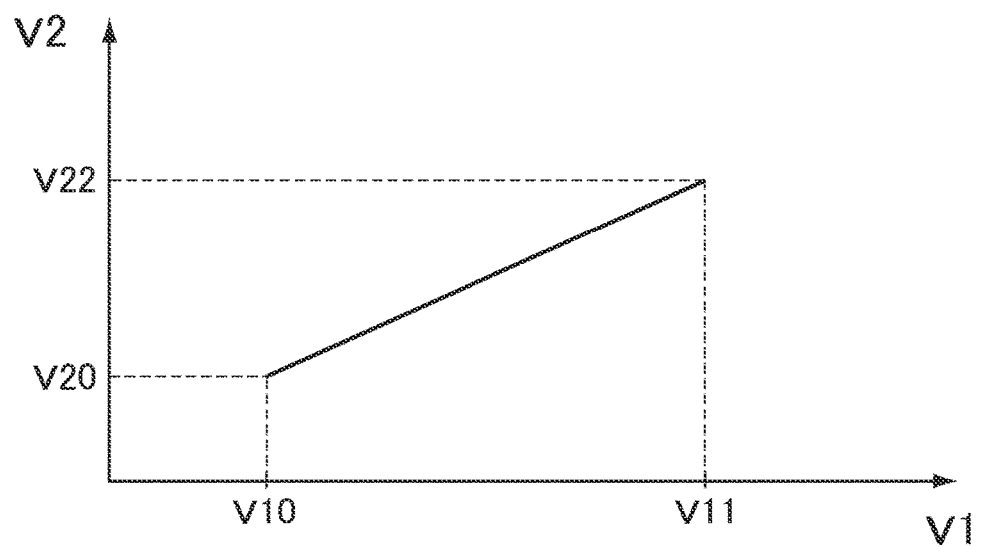
FIG. 17 is a diagram illustrating a map in which rotation speeds V2 of a second output shaft 12A are defined in accordance with rotation speeds V1 of the first output shaft 11A.

Moreover, the microcomputer 58 may perform control to change the wiping speeds of the wiper blades and so on, based on the position of the driver's seat side wiper blade 18 between the lower return position P2D and the upper return position P1D and the amount of enlargement of the front passenger seat side wiper arm 35. Explanation follows regarding an example of wiping speed control in a case in which the rotation angle of the second output shaft 12A is set to a large second predetermined rotation angle, and the front passenger seat side wiper arm 35 is set with a large amount of enlargement. In such a case, the rotation speed of the first output shaft 11A is gradually slowed as the rotation angle of the first output shaft 11A of the first motor 11 approaches the intermediate rotation angle. Moreover, the rotation speed of the first output shaft 11A is controlled so as to be very low when the rotation angle of the first output shaft 11A has reached the intermediate rotation angle, namely, when the front passenger seat side wiper arm 35 is at its most extended. A rotation speed map for the first output shaft 11A defined corresponding to the rotation angle of the first output shaft 11A or the like (see FIG. 16) is employed to control the rotation speed of the first output shaft 11A. Moreover, the rotation speed of the second output shaft 12A is also controlled according to the rotation speed of the first output shaft 11A. For example, by employing a second output shaft rotation angle map such as that illustrated in FIG. 10, the rotation of the second output shaft 12A can be synchronized with the rotation of the first output shaft 11A, thereby enabling the rotation speed of the second output shaft 12A to be controlled according to the increase or decrease in the rotation speed of the first output shaft 11A, based on the rotation speed of the first output shaft 11A and on a map of rotation speeds V2 of the second output shaft 12A (see FIG. 17) defined in accordance with rotation speeds V1 of the first output shaft 11A. Such control enables the speed at which the front passenger seat side wiper arm 35 extends and the wiping speed of the front passenger seat side wiper blade 36 to be made gentler, such that an occupant is less likely to be distracted by the front passenger seat side wiper arm 35 appearing to suddenly grow longer The washer motor drive circuit 57 includes a relay unit 84 including two inbuilt relays RLY1, RLY2, and two FETs 86A, 86B. Relay coils of the relays RLY1, RLY2 of the relay unit 84 are respectively connected to the relay drive circuit 78. The relay drive circuit 78 switches the relays RLY1, RLY2 ON/OFF (excites/stops excitation of the relay coils). When the relay coils of the relays RLY1, RLY2 are not excited, common terminals 84C1, 84C2 are maintained in a state respectively connected to first terminals 84A1, 84A2 (an OFF state), and when the relay coils are excited, the common terminals 84C1, 84C2 are switched to a state respectively connected to the second terminals 84B1, 84B2. The common terminal 84C1 of the relay RLY1 is connected to one end of the washer motor 64, and the common terminal 84C2 of the relay RLY2 is connected to the other end of the washer motor 64. Moreover, the first terminals 84A1, 84A2 of the relays RLY1, RLY2 are respectively connected to the drain of the FET 86B, and second terminals 84B1, 84B2 of the relays RLY1, RLY2 are respectively connected to the power source (+B).

The gate of the FET 86B is connected to the FET drive circuit 80, and the source of the FET 86B is connected to earth. The ON/OFF duty ratio of the FET 86B is controlled by the FET drive circuit 80. Moreover, the FET 86A is provided between the drain of the FET 86B and the power source (+B). The gate of the FET 86A is not input with control signals, and so the FET 86A is not switched ON/OFF. The FET 86A is provided to serve the role of a surge-absorbing parasitic diode.

The relay drive circuit 78 and the FET drive circuit 80 switch the two relays RLY1, RLY2 and the FET 86B ON/OFF in order to control drive of the washer motor 64. Namely, when an output shaft of the washer motor 64 is rotated in a predetermined direction (forward rotation), the relay drive circuit 78 switches the relay RLY1 ON (and the relay RLY2 OFF), and the FET drive circuit 80 switches the FET 86B ON at a predetermined duty ratio. This control is used to controls the rotation speed of the output shaft of the washer motor 64.

Figure 11:
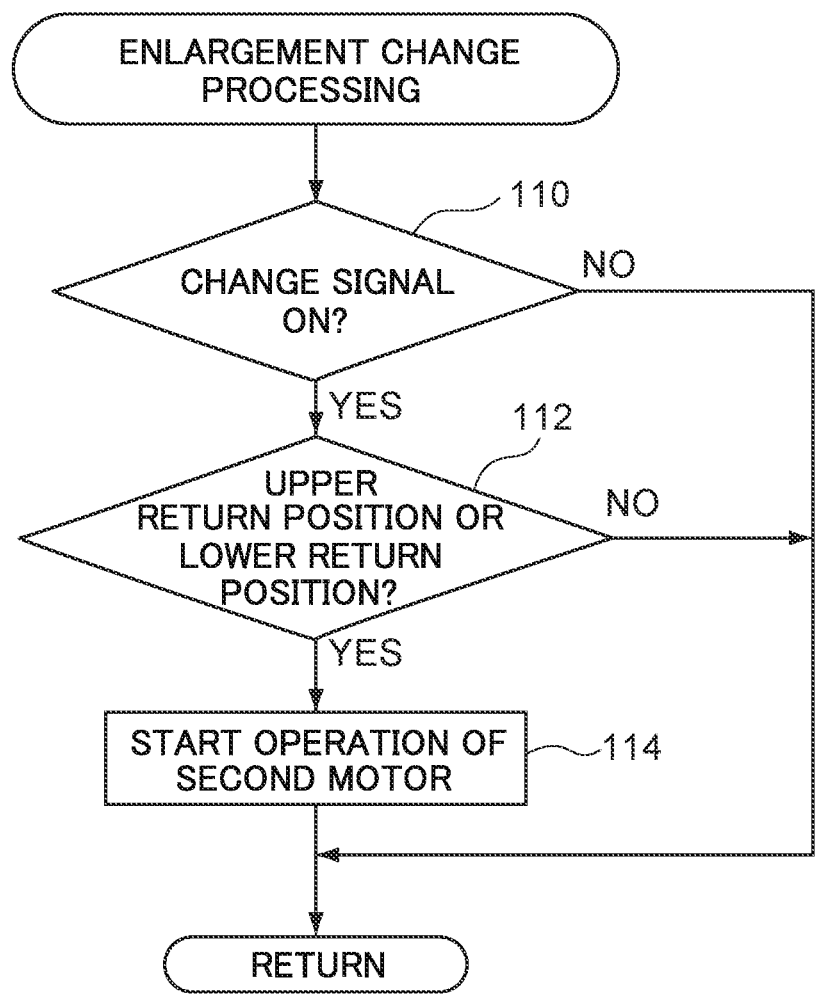
FIG. 11 is a flowchart illustrating an example of enlargement processing to change an enlargement ratio (amount of extension) of a front passenger seat side wiper arm, for example so as to change from a normal wiping operation to an enlarged wiping operation in a vehicle wiper device according to an exemplary embodiment of technology disclosed herein.

Explanation follows regarding control of the wiper system 100 according to the present exemplary embodiment. FIG. 11 is a flowchart illustrating an example of processing to change the position of the wiping range of the front passenger seat side wiper arm 35, for example so as to change from a normal wiping operation to an enlarged wiping operation, in the wiper device 2 according to the present exemplary embodiment. The sequence illustrated in FIG. 11 is processed by the microcomputer 58 of the control circuit 52.

At step 110, determination is made as to whether or not a change signal indicating that the enlargement mode switch provided to the wiper switch 50 has been switched ON has been input. Processing transitions to step 112 in cases in which determination is affirmative, and the processing returns to the beginning in cases in which determination is negative.

At step 112, the position of the front passenger seat side wiper blade 36 is computed based on the first output shaft rotation angle $\theta_A$ detected by the first absolute angle sensor 114, and determination is made as to whether or not the computed position of the front passenger seat side wiper blade 36 is either the upper return position P1P or the lower return position P2P. The present exemplary embodiment includes an outward path enlarged wiping operation in which the enlarged wiping operation is performed on the outward path and the normal wiping operation is performed on the return path, and a return path enlarged wiping operation in which the normal wiping operation is performed on the outward path and the enlarged wiping operation is performed on the return path. In the case of the outward path enlarged wiping operation, the front passenger seat side wiper arm 35 starts to extend after the front passenger seat side wiper blade 36 has changed direction at the lower return position P2P, and so determination is affirmative at step 112 in cases in which the front passenger seat side wiper blade 36 has reached the lower return position P2P. In the case of the return path enlarged wiping operation, the front passenger seat side wiper arm 35 starts to extend after the front passenger seat side wiper blade 36 has changed direction at the upper return position P1P, and so determination is affirmative at step 112 in cases in which the front passenger seat side wiper blade 36 has reached the upper return position P1P.

Figure 12:
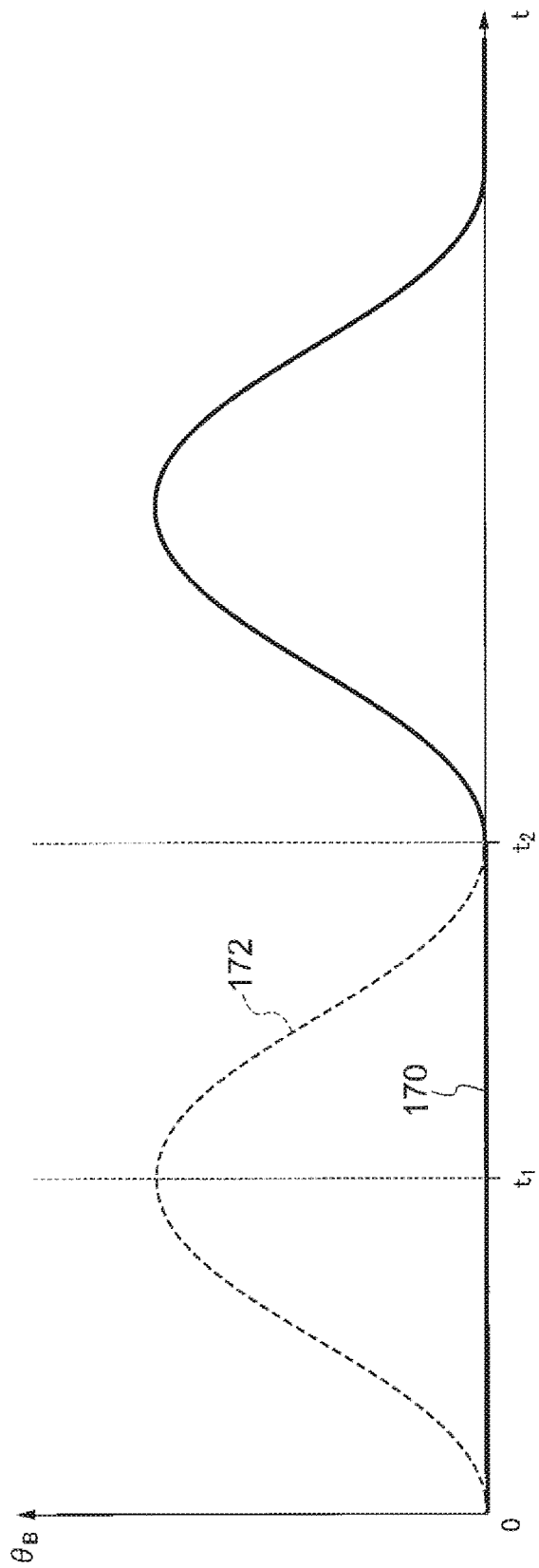
FIG. 12 illustrates an example of change over time in the rotation angle of an output shaft of a second motor according to an exemplary embodiment of technology disclosed herein.

When determination is negative at step 112, the processing returns to the beginning, and when determination is affirmative at step 112, operation of the second motor 12 is started at step 114, and processing returns to the beginning. FIG. 12 illustrates an example of change over time in the rotation angle (second output shaft rotation angle $\theta_B$) of the second output shaft 12A of the second motor 12 according to the present exemplary embodiment. Note that although FIG. 12 illustrates a case in which the enlargement mode switch was switched ON at a timing $t_1$ ($0<t_1<t_2$), an angle curve 170 illustrating change in the second output shaft rotation angle $\theta_B$ continues to indicate 0°, namely that the second output shaft 12A is not rotating.

Note that step 114 is an example of a "wiping range position changing step" of technology disclosed herein.

At timing $t_2$ in FIG. 12, when the first output shaft rotation angle $\theta_A$ detected by the first absolute angle sensor 114 indicates that the front passenger seat side wiper arm 35 has reached either the lower return position P2P or the upper return position P1P, control of the second output shaft 12A of the second motor 12 is started according to an enlarged wiping operation map 172, thereby rotating the second output shaft 12A. Due to this control, the front passenger seat side wiper arm 35 extends from when the front passenger seat side wiper blade 36 has reached either the lower return position P2P or the upper return position P1P, rather than as soon as the enlargement mode switch has been switched ON. The enlarged wiping operation can thus be controlled so as to start in a manner that is less distracting after the enlargement mode switch is operated.

In the above example, determination is made as to whether or not the position of the front passenger seat side wiper blade 36 is either the upper return position P1P or the lower return position P2P. However, technology disclosed herein is not limited thereto, and determination may be made as to whether or not the front passenger seat side wiper blade 36 is positioned in a predetermined range in the vicinity of either the upper return position P1P or the lower return position P2P.

Note that the processing to change the wiping range position at step 114 in FIG. 11 is an example in which the normal wiping operation at an enlargement ratio of 0% is changed to the enlarged wiping operation at an enlargement ratio of 100%. However, in the present exemplary embodiment, a separate enlargement ratio adjustment switch may be provided to enable the enlargement ratio representing the amount of extension of the front passenger seat side wiper arm 35 to be set as desired in a range of from 0% to 100%. In cases in which such an enlargement ratio adjustment switch is provided, control such as the following becomes possible.

Note that the enlargement ratio is an example of "a degree to which the position of the wiping range of the wiper arm is changed" of technology disclosed herein. The enlargement ratio adjustment switch is an example of a "degree changing section" of technology disclosed herein.

As an example, explanation follows regarding a case in which extension of the front passenger seat side wiper arm 35 is controlled corresponding to an enlargement ratio X of the wiping range, expressed as a numerical value from 0 to 1.0. In the following explanation, the rotation angle of the second output shaft 12A is controlled so as to attain the second output shaft rotation angle $\theta_B$ computed according to Equation (1) below using the enlargement ratio X and the second output shaft rotation angle map illustrated in FIG. 13.

$$\theta_B = \{f(\theta_A) - g(\theta_A)\} \cdot X + g(\theta_A) \quad (1)$$

Figure 13:
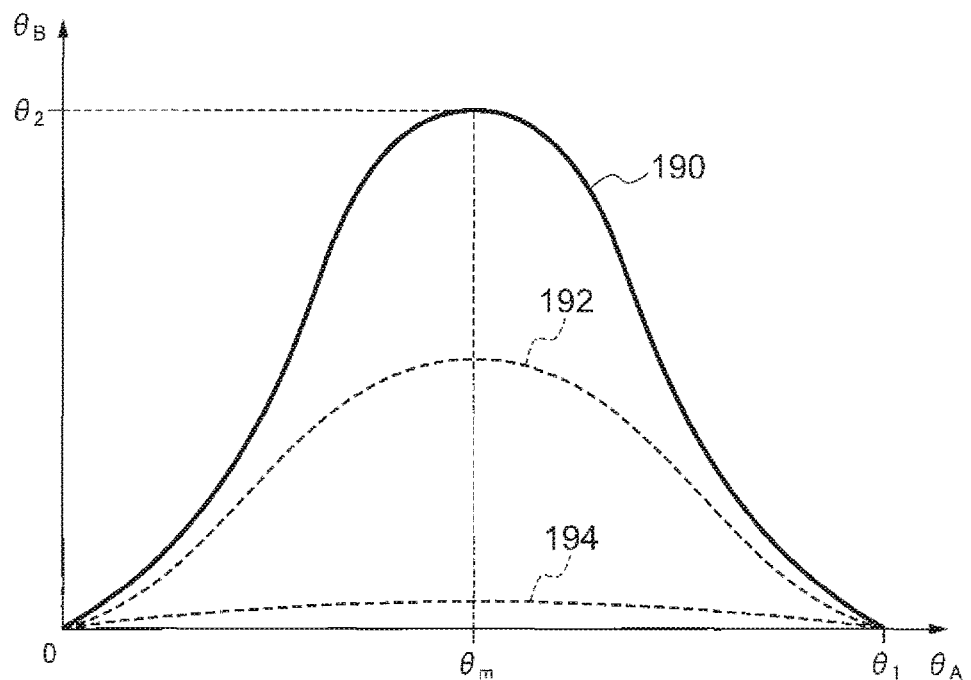
FIG. 13 illustrates an example of a second output shaft rotation angle map that defines rotation angles of a second output shaft in accordance with rotation angles of a first output shaft for each enlargement ratio in an exemplary embodiment of technology disclosed herein.

In Equation (1), $\theta_A$ is the first output shaft rotation angle $\theta_A$, this being the rotation angle of the first output shaft 11A illustrated in FIG. 10 and FIG. 13. $f(\theta_A)$ is the rotation angle of the second output shaft 12A determined according to the first output shaft rotation angle $\theta_A$ when the enlargement ratio X is 1.0 (equivalent to 100%), represented by the curve 190 in FIG. 13. $g(\theta_A)$ is the rotation angle of the second output shaft 12A determined according to the first output shaft rotation angle $\theta_A$ when the enlargement ratio X is 0 (equivalent to 0%), represented by the curve 194 in FIG. 13.

When the enlargement ratio X is equivalent to 0%, namely, when the second motor 12 is not rotated, theoretically, the rotation angle $g(\theta_A)$ of the second output shaft 12A should always be 0°, regardless of the value of the first output shaft rotation angle $\theta_A$. However, in the present exemplary embodiment, the link mechanism that moves the fifth axis L5 configuring the pivot point of the front passenger seat side wiper arm 35 is sometimes affected by the drive force of the first motor 11 that moves the driver's seat side wiper arm 17 and the front passenger seat side wiper arm 35 back and forth. There are therefore cases in which $g(\theta_A)$ is not actually always 0° regardless of the value of the first output shaft rotation angle $\theta_A$.

Note that if the change in $g(\theta_A)$ with respect to the first output shaft rotation angle $\theta_A$ were ignorable, the second output shaft rotation angle $\theta_B$ for the enlargement ratio X could be computed as the product of $f(\theta_A)$ and X as in Equation (2) below.

$$\theta_B = f(\theta_A) \cdot X \quad (2)$$

The curve 192 in FIG. 13 is the second output shaft rotation angle $\theta_B$ in cases in which the enlargement ratio X computed based on Equation (1) is 0.5 (equivalent to 50%). The second output shaft rotation angle $\theta_B$ represented by the curve 192 is approximately half the angle represented by the curve 190 when the enlargement ratio X is equivalent to 100%.

Figure 14:
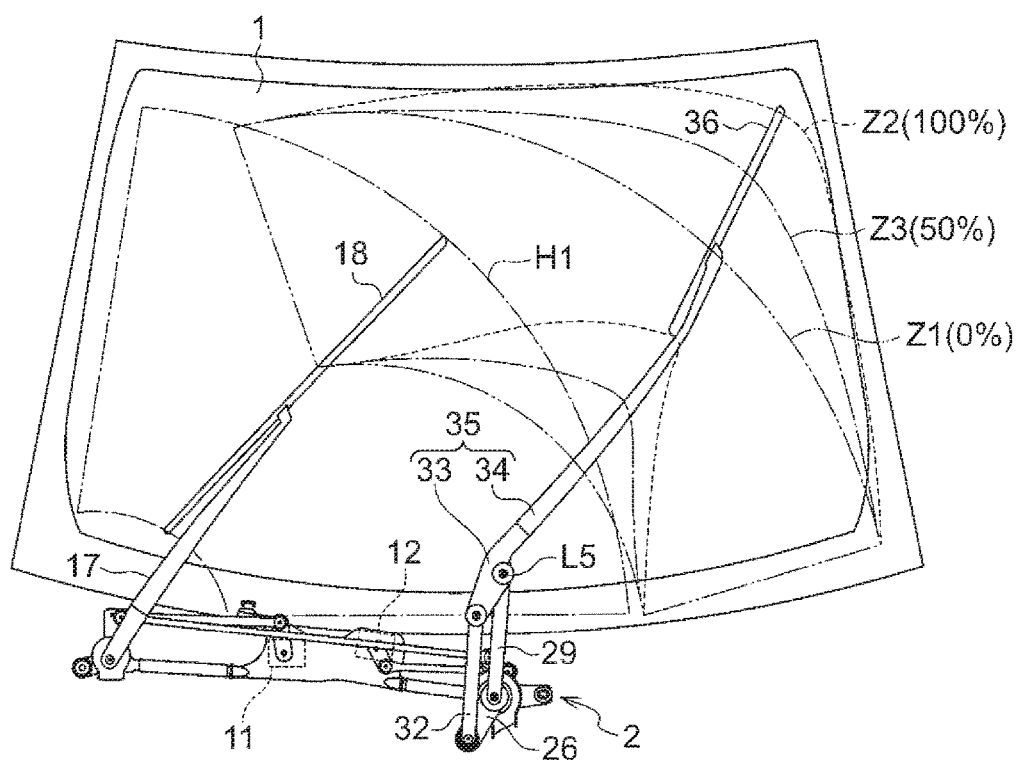
FIG. 14 is a schematic diagram illustrating an example of changes according to a wiping range according to an enlargement ratio in a vehicle wiper device according to an exemplary embodiment of technology disclosed herein.
Figure 15:
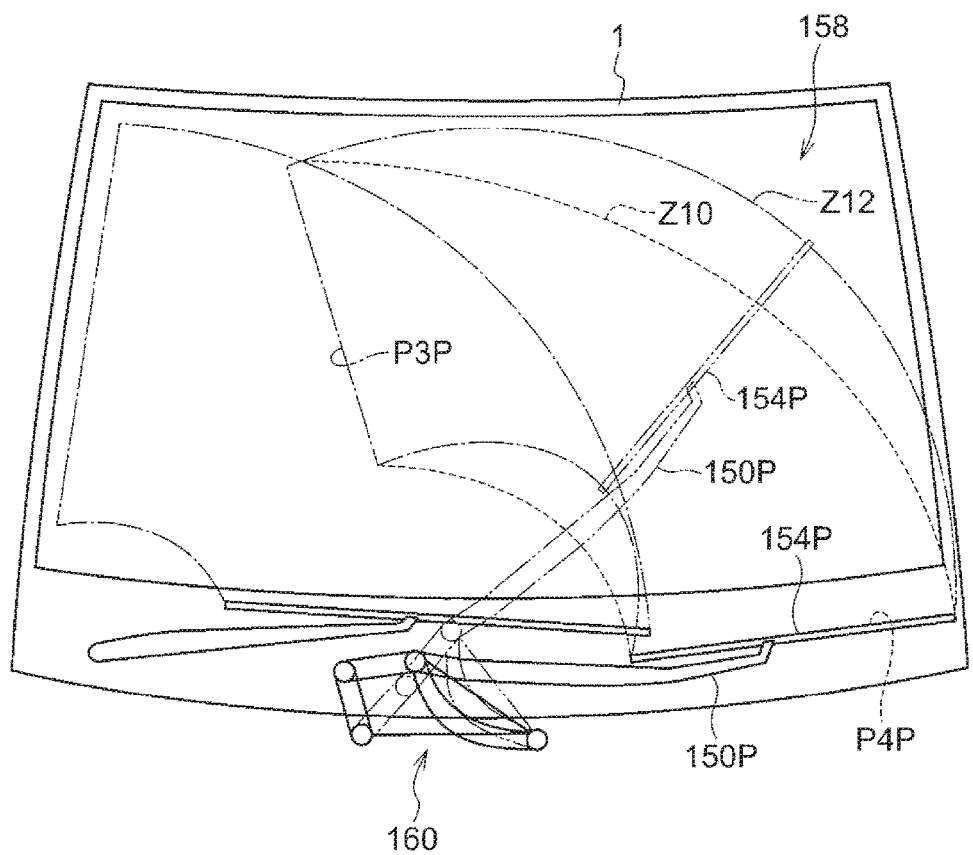
FIG. 15 is a schematic diagram illustrating an example of a wiper device including a four-piece link mechanism.

FIG. 14 illustrates example of changes to the wiping range corresponding to the enlargement ratio X. FIG. 14 respectively illustrates the case of a wiping range Z1 with an enlargement ratio X equivalent to 0%, the case of a wiping range Z2 with an enlargement ratio X equivalent to 100%, and the case of a wiping range Z3 with an enlargement ratio X equivalent to 50%. As illustrated in FIG. 14, the enlargement ratio X is changed by user operation, thereby further suppressing movement that makes the front passenger seat side wiper arm 35 appear to suddenly extend, and thus enabling an enlarged wiping operation to be made less distracting.

As described above, in the present exemplary embodiment, when the switch for the enlarged wiping operation has been switched ON, the enlarged wiping operation does not start immediately after the switch is switched ON. In the present exemplary embodiment, the enlarged wiping operation starts when the position of the front passenger seat side wiper blade 36 has reached the lower return position P2P or the upper return position P1P, as indicated by the first output shaft rotation angle $\theta_A$ detected as the rotation angle of the first output shaft 11A by the first absolute angle sensor 114. In other words, switching ON the switch for the enlarged wiping operation is not on its own a sufficient condition to perform the enlarged wiping operation. The enlarged wiping operation is started when the rotation angle of the first output shaft 11A (the first output shaft rotation angle $\theta_A$) has become an angle corresponding to the lower return position P2P or the upper return position P1P of the front passenger seat side wiper blade 36.

As soon as the front passenger seat side wiper blade 36 reaches the lower return position P2P or the upper return position P1P, the front passenger seat side wiper blade 36 changes direction and sets out on the outward path or the return path. When the front passenger seat side wiper blade 36 and the front passenger seat side wiper arm 35 set out on the outward path or the return path, the rotation angle of the second output shaft 12A of the second motor 12 (second output shaft rotation angle $\theta_B$) is controlled according to the maps illustrated in FIG. 10 and FIG. 13. This thereby enables provision of a vehicle wiper device and vehicle wiper device control method that are capable of changing the position of a wiping range of a wiper arm in a manner that is less distracting.

Note that in the present exemplary embodiment, the first output shaft 11A of the first motor 11 and the second output shaft 12A of the second motor 12 are controlled so as to be capable of rotating forward and backward (back and forth). However, there is no limitation thereto. For example, configuration may be made in which either the first output shaft 11A or the second output shaft 12A is rotated in one direction only.

Note that in the present exemplary embodiment, the rotation of the first output shaft 11A of the first motor 11 moves the driver's seat side wiper blade 18 and the front passenger seat side wiper blade 36 between the upper return positions P1D, P1P and the lower return positions P2D, P2P. However, there is no limitation thereto. For example, a structure may include a "driver's seat side first motor" and a "front passenger seat side first motor" as the first motor 11, such that the driver's seat side wiper blade 18 is moved between the upper return position P1D and the lower return position P2D by rotation of the driver's seat side first motor, and the front passenger seat side wiper blade 36 is moved between the upper return position MP and the lower return position P2P by rotation of the front passenger seat side first motor.

Note that the present exemplary embodiment employs a structure in which the driver's seat side wiper blade 18 and the front passenger seat side wiper blade 36 do not overlap in the vehicle width direction at the lower return positions P2D, P2P. However, there is no limitation thereto. For example, the length of the driver's seat side wiper blade 18 side of the front passenger seat side wiper blade 36 may be increased. In other words, the length of the front passenger seat side wiper blade 36 may be set such that the driver's seat side wiper blade 18 side of the front passenger seat side wiper blade 36 overlaps with the front passenger seat side wiper blade 36 side of the driver's seat side wiper blade 18. This thereby enables a region at a central lower side of the windshield glass that cannot be wiped to be made smaller when moving back and forth to wipe the wiping range Z2.

Note that in the present exemplary embodiment, the front passenger seat side wiper arm 35 (front passenger seat side wiper blade 36) is controlled so as to extend until it reaches the vicinity of an intermediate angle of the predetermined rotation angle of the first output shaft 11A, and the front passenger seat side wiper arm 35 (front passenger seat side wiper blade 36) is controlled so as to retract between the vicinity of the intermediate angle and the predetermined rotation angle. However, there is no limitation thereto. For example, the front passenger seat side wiper arm 35 may be controlled so as to gradually extend as the front passenger seat side wiper blade 36 wipes from the lower return position P2P toward the upper return position P1P (when wiping on the outward path).

Note that in the present exemplary embodiment, explanation has been given in which the rotation angle of the first output shaft 11A of the first motor 11 and the rotation angle of the second output shaft 12A of the second motor 12 are employed. Alternatively, the rotation position of the first output shaft 11A and the rotation position of the second output shaft 12A may be employed.

Note that the area of the wiping range Z2 of the wiper arm when the position of the wiping range of the wiper arm has been changed is greater than the area of the wiping range Z1 (see FIG. 1) of the wiper arm when the position of the wiping range of the wiper arm has not been changed. The technology disclosed herein is not limited thereto. The wiping range Z1 and the wiping range Z2 may be the same size as each other, or the wiping range Z2 may be smaller than the wiping range Z1.

Explanation has been given regarding an exemplary embodiment. However, the present invention is not limited thereto, and obviously various modifications may be implemented within a range not departing from the spirit thereof.

The disclosure of Japanese Patent Application No. 2016-010044 is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

EXPLANATION OF THE REFERENCE NUMERALS 1 windshield glass (windshield)
1A light-blocking portion
2 wiper device
3 central frame
3A support portion
4 pipe frame
5 pipe frame
6 first holder member
6A fixing portion
7 second holder member
7A fixing portion
7B tubular portion
11 first motor
11A first output shaft
12 second motor
12A second output shaft
13 first drive crank arm
14 second drive crank arm
15 driver's seat side pivot shaft
16 driver's seat side swing lever
17 driver's seat side wiper arm
18 driver's seat side wiper blade
19 first coupling rod
21 first front passenger seat side pivot shaft
22 second front passenger seat side pivot shaft
23, 24 shaft bearing
25 first front passenger seat side swing lever
26 first drive lever
27 second coupling rod
28 second front passenger seat side swing lever
29 second drive lever
31 third coupling rod
32 first following lever
33 arm head
34 retainer
35 front passenger seat side wiper arm
36 front passenger seat side wiper blade
50 wiper switch
52 control circuit
54 direction indicator switch
56 drive circuit
57 washer motor drive circuit
58 microcomputer
60 memory
62 washer switch
64 washer motor
66 washer pump
68 washer liquid tank
70 washer device
72A driver's seat side hose
72B front passenger seat side hose
74A driver's seat side nozzle
74B front passenger seat side nozzle
76 rain sensor
78 relay drive circuit
80 FET drive circuit
84 relay unit
84A1, 84A2 first terminal
84B1, 84B2 second terminal
84C1, 84C2 common terminal
90 vehicle ECU
92 vehicle speed sensor
94 onboard camera
96 GPS system
98 steering angle sensor
100 wiper system
104 first pre-driver
106 second pre-driver
108 first motor drive circuit
110 second motor drive circuit
112 output shaft end portion
112A sensor magnet
114 first absolute angle sensor
116 output shaft end portion
116A sensor magnet
118 second absolute angle sensor
122A, 122B region
135 front passenger seat side wiper arm
136 front passenger seat side wiper blade
150P front passenger seat side wiper arm
140 mark
142 trajectory
150P front passenger seat side wiper arm
154P front passenger seat side wiper blade
158 non-wiped region
160 four-piece link mechanism
164 enlarged wiping operation map
170 angle curve
172 enlarged wiping operation map
190, 192, 194 curve
RLY1, RLY2 relay
CC1, CC2, CC3, CW1, CW2 rotation direction
CW3 movement direction
H1 wiping range
K waterproof cover
L1 first axis
L2 second axis
L3 third axis
L4 fourth axis
L same straight line
L5 fifth axis
P1D, P1P, P3P upper return position
P2D, P2P, P4P lower return position
Z1, Z2, Z3, Z10, Z12 wiping range
$\theta_1$ first predetermined rotation angle
$\theta_2$ second predetermined rotation angle
$\theta_A$ first output shaft rotation angle
$\theta_B$ second output shaft rotation angle
$\theta_m$ intermediate rotation angle

The invention claimed is:

1. A vehicle wiper device comprising:
a first motor that includes a first output shaft, that rotates the first output shaft to rotate a wiper arm back and forth about a pivot point of the wiper arm, and that causes a wiper blade coupled to a leading end portion of the wiper arm to perform a back and forth wiping operation between two return positions provided at different positions to each other on a windshield;
a second motor that includes a second output shaft and that rotates the second output shaft to change a position of a wiping range of the windshield by the wiper blade; and
a controller that controls rotation of the second motor when a command to operate the second motor has been input during the wiping operation of the wiper blade so as to start operation of the second motor when the wiper blade performing the wiping operation is positioned within a predetermined range in the vicinity of one of the two return positions.

2. The vehicle wiper device of claim 1, wherein:
the second output shaft of the second motor is coupled to the wiper arm through a link mechanism, and the second motor rotates the second output shaft to move the pivot point of the wiper arm between a first position and a second position separate from and above the first position on a front passenger seat side; and
when a command to operate the second motor is input during the wiping operation of the wiper blade, the controller controls rotation of the second motor so as to start operation of the second motor when the wiper blade performing the wiping operation is positioned within a predetermined range in the vicinity of one of the two return positions, and such that the pivot point of the wiper arm moves back and forth between the first position and the second position by the time the wiper blade reaches the other of the two return positions.

3. The vehicle wiper device of claim 2, further comprising:
a rotation angle detector that detects a rotation angle of the first output shaft, wherein
when a command to operate the second motor has been input, the controller controls rotation of the second output shaft so as to move the pivot point of the wiper arm from the first position to the second position between when the rotation angle of the first output shaft detected by the rotation angle detector reaches an angle corresponding to a position within a predetermined range in the vicinity of one of the two return positions and when the rotation angle of the first output shaft detected by the rotation angle detector reaches an angle corresponding to an intermediate position between the two return positions, and also controls rotation of the second output shaft to move the pivot point of the wiper arm from the second position to the first position between when the rotation angle of the first output shaft detected by the rotation angle detector reaches an angle corresponding to an intermediate position between the two return positions and when the rotation angle of the first output shaft detected by the rotation angle detector reaches an angle corresponding to the other of the two return positions.

4. The vehicle wiper device of claim 1, further comprising:
a degree changing section that is configured to change a degree to which the position of the wiping range of the wiper arm is changed and that outputs a signal indicating the degree changed, wherein
the controller controls rotation of the second motor based on a rotation angle of the second output shaft corresponding to the degree indicated by a signal input from the degree changing section.

5. The vehicle wiper device of claim 4, wherein the controller determines a rotation angle of the second output shaft corresponding to the degree, based on the degree and on a rotation angle control map defining rotation angles of the second output shaft against rotation angles of the first output shaft.

6. A vehicle wiper device control method comprising:
a step of, for a first motor that includes a first output shaft and that rotates the first output shaft so as to rotate a wiper arm about a pivot point of the wiper arm such that a wiper blade coupled to a leading end portion of the wiper arm performs a wiping operation between two return positions provided at different positions to each other on a windshield, starting rotation of the first output shaft of the first motor;
a second motor operation command detection step of, for a second motor that includes a second output shaft and that rotates the second output shaft to change a position of a wiping range of the windshield by the wiper blade, detecting a command to operate the second motor; and
a wiping range position changing step of controlling rotation of the second motor when a command to operate the second motor has been detected during the wiping operation of the wiper blade, so as to start operation of the second motor when the wiper blade performing the wiping operation is positioned within a predetermined range in the vicinity of one of the two return positions.

7. The vehicle wiper device control method of claim 6, wherein at the wiping range position changing step, when a command to operate the second motor has been detected at the second motor operation command detection step, operation of the second motor of which the second output shaft is coupled to the wiper arm through a link mechanism is started when the wiper blade performing the wiping operation is positioned within a predetermined range in the vicinity of one of the two return positions, and rotation of the second motor is controlled such that the pivot point of the wiper arm is moved back and forth between a first position and a second position separate from and above the first position on a front passenger seat side by rotation of the second output shaft by the time the wiper blade reaches the other of the two return positions.

8. The vehicle wiper device control method of claim 7, further comprising a rotation angle detection step of detecting a rotation angle of the first output shaft, wherein:
when a command to operate the second motor has been detected at the second motor operation command detection step, at the wiping range position changing step, control is performed to rotate the second output shaft such that the pivot point of the wiper arm is moved from the first position to the second position between when the rotation angle of the first output shaft detected at the rotation angle detection step reaches an angle corresponding to a position within a predetermined range in the vicinity of one of the two return positions and when the rotation angle of the first output shaft detected at the rotation angle detection step reaches an angle corresponding to an intermediate position between the two return positions, and control is performed to rotate the second output shaft such that the pivot point of the wiper arm moves from the second position to the first position between when the rotation angle of the first output shaft detected at the rotation angle detection step reaches an angle corresponding to an intermediate position between the two return positions and when the rotation angle of the first output shaft detected at the rotation angle detection step reaches an angle corresponding to the other of the two return positions.

9. The vehicle wiper device control method of claim 6, further comprising a degree detection step of detecting a signal indicating a degree of change to a position of the wiping range of the wiper arm; wherein
at the wiping range position changing step, rotation of the second motor is controlled based on a rotation angle of the second output shaft corresponding to the degree detected at the degree detection step.

10. The vehicle wiper device control method of claim 9, wherein at the wiping range position changing step, a rotation angle of the second output shaft corresponding to the degree is determined based on the degree and on a rotation angle control map defining rotation angles of the second output shaft against rotation angles of the first output shaft.

11. The vehicle wiper device of claim 3, wherein the controller controls rotation of the first motor and rotation of the second motor so as to progressively reduce a rotation speed of the first output shaft and a rotation speed of the second output shaft as a rotation angle of the first output shaft detected by the rotation angle detector approaches an angle corresponding to an intermediate position between the two return positions after reaching an angle corresponding to a predetermined range in the vicinity of one of the two return positions.

12. The vehicle wiper device control method of claim 8, wherein at the wiping range position changing step, rotation of the first motor and rotation of the second motor are controlled so as to progressively reduce a rotation speed of the first output shaft and a rotation speed of the second output shaft as a rotation angle of the first output shaft detected at the rotation angle detection step approaches an angle corresponding to an intermediate position between the two return positions after reaching an angle corresponding to a predetermined range in the vicinity of one of the two return positions.

* * * * *